(12) United States Patent
Sakai et al.

(10) Patent No.: US 10,754,906 B2
(45) Date of Patent: Aug. 25, 2020

(54) INFORMATION PROCESSING APPARATUS, INFORMATION PROCESSING SYSTEM, INFORMATION PROCESSING METHOD, AND RECORDING MEDIUM

(71) Applicant: KABUSHIKI KAISHA TOSHIBA, Tokyo (JP)

(72) Inventors: Masahiro Sakai, Kanagawa (JP); Myungsook Ko, Tokyo (JP); Eiichi Sunagawa, Kanagawa (JP); Takahiro Nishizawa, Kanagawa (JP); Tetsuya Gotou, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 806 days.

(21) Appl. No.: 14/856,002

(22) Filed: Sep. 16, 2015

(65) Prior Publication Data

US 2016/0085816 A1    Mar. 24, 2016

(30) Foreign Application Priority Data

Sep. 19, 2014 (JP) .................................. 2014-191940

(51) Int. Cl.
*G06F 7/00* (2006.01)
*G06F 16/9537* (2019.01)
(Continued)

(52) U.S. Cl.
CPC ...... *G06F 16/9537* (2019.01); *G06F 16/3331* (2019.01); *G06F 16/9535* (2019.01); *H04L 67/18* (2013.01); *H04L 67/306* (2013.01)

(58) Field of Classification Search
USPC ....................................................... 707/953
See application file for complete search history.

(56) References Cited

U.S. PATENT DOCUMENTS

| 8,271,315 B2 | 9/2012 | Kagiwada |
| 8,433,595 B2 | 4/2013 | Fushimi et al. |
| (Continued) | | |

FOREIGN PATENT DOCUMENTS

| JP | 2003-6512 | 1/2003 |
| JP | 2004-326227 | 11/2004 |
| (Continued) | | |

OTHER PUBLICATIONS

Shaw et al., "Learning to Rank for Spatiotemporal Search", WSDM, pp. 717-726, (2013).

(Continued)

*Primary Examiner* — Eliyah S. Harper
(74) *Attorney, Agent, or Firm* — Finnegan, Henderson, Farabow, Garrett & Dunner, L.L.P.

(57) ABSTRACT

According to one embodiment, an information processing apparatus includes a preference information obtainer that obtains preference information indicating preferences of a target user to which recommendation is to be made, the preferences ranging over a plurality of genres. The information processing apparatus includes a recommendation item determiner that determines, using the preference information of the target user and recommendation candidate information about a plurality of recommendation candidates ranging over a plurality of genres, a recommendation item to be recommended to the target user from the plurality of recommendation candidates, the recommendation candidate information being stored in an accessible storage apparatus.

9 Claims, 14 Drawing Sheets

(51) Int. Cl.
*H04L 29/08* (2006.01)
*G06F 16/9535* (2019.01)
*G06F 16/33* (2019.01)

(56) References Cited

U.S. PATENT DOCUMENTS

| | | | |
|---|---|---|---|
| 9,593,957 B2* | 3/2017 | Zheng | G01C 21/3484 |
| 2007/0073553 A1* | 3/2007 | Flinn | G06Q 30/02 |
| | | | 705/1.1 |
| 2007/0073554 A1* | 3/2007 | Flinn | G06Q 30/02 |
| | | | 705/1.1 |
| 2008/0077471 A1* | 3/2008 | Musgrove | G06Q 30/02 |
| | | | 705/7.29 |
| 2008/0120129 A1* | 5/2008 | Seubert | G06Q 10/06 |
| | | | 705/35 |
| 2012/0143802 A1* | 6/2012 | Balakrishnan | G06Q 30/0203 |
| | | | 706/14 |
| 2015/0066915 A1* | 3/2015 | Golder | G06F 17/30867 |
| | | | 707/723 |
| 2016/0085816 A1* | 3/2016 | Sakai | G06F 16/9537 |
| | | | 707/734 |
| 2017/0124074 A1* | 5/2017 | Cama | G06F 17/3005 |

FOREIGN PATENT DOCUMENTS

| | | |
|---|---|---|
| JP | 3665015 | 6/2005 |
| JP | 2008-117099 | 5/2008 |
| JP | 2008-158823 | 7/2008 |
| JP | 2010-9315 | 1/2010 |
| JP | 2010-224989 | 10/2010 |
| JP | 2010-262401 | 11/2010 |
| JP | 4822317 | 11/2011 |
| JP | 2012-113544 | 6/2012 |
| JP | 5056801 | 10/2012 |
| JP | 5183001 | 1/2013 |
| JP | 2013-25324 | 2/2013 |
| JP | 2015-22354 | 2/2015 |

OTHER PUBLICATIONS

Jannach et al., "Recommender Systems: An Introduction—Theory and Practice," Kyoritsu Shuppan Co., Ltd. (Jun. 25, 2012), pp. 13-16, 52-55, and 125-144.

* cited by examiner

STORE WHERE TARGET USER IS CURRENTLY STAYING: JAPANESE DELI STORE E

| NAME OF STORE | DEGREE OF MATCHING S | CORRECTION COEFFICIENT $(\beta/\alpha)^c$ | CORRECTED DEGREE OF MATCHING S' |
|---|---|---|---|
| RESTAURANT G | 5.0 | × 0.3 | 1.5 |
| BOOKSTORE M | 3.5 | × 1 | 3.5 |
| CLOTHING STORE B | 3.0 | × 0.9 | 2.7 |
| MISO SOUP STORE M | 2.0 | × 2.5 | 5 |
| CAFE S | 2.0 | × 0.8 | 1.6 |
| TEA STORE M | 1.8 | × 1.5 | 2.7 |
| ... | ... | ... | ... |

FIG. 14

INFORMATION PROCESSING APPARATUS, INFORMATION PROCESSING SYSTEM, INFORMATION PROCESSING METHOD, AND RECORDING MEDIUM

CROSS REFERENCE TO RELATED APPLICATION(S)

This application is based upon and claims the benefit of priority from the prior Japanese Patent Application No. 2014-191940, filed on Sep. 19, 2014, the entire contents of which are incorporated herein by reference.

FIELD

Embodiments described herein relate generally to an information processing apparatus, an information processing system, an information processing method, and a recording medium.

BACKGROUND

Conventionally, there is known a system that recommends stores, goods (e.g., commodities), or content (e.g., text, music, and moving images) to a user to which recommendation is to be made (hereinafter, referred to as a target user). In the conventional system, stores or hotels are recommended to the target user on a genre-by-genre basis, the genres including restaurants and hotels. However, recommendation crossing over genres such as restaurants and hotels to the target user has not been made.

BRIEF DESCRIPTION OF THE DRAWINGS

FIG. 14 is a diagram showing an example of computation of the corrected degree of matching according to the second embodiment.

DETAILED DESCRIPTION

Embodiments will now be explained with reference to the accompanying drawings. The present invention is not limited to the embodiments.

According to one embodiment, an information processing apparatus includes a preference information obtainer that obtains preference information indicating preferences of a target user to which recommendation is to be made, the preferences ranging over a plurality of genres. The information processing apparatus includes a recommendation item determiner that determines, using the preference information of the target user and recommendation candidate information about a plurality of recommendation candidates ranging over a plurality of genres, a recommendation item to be recommended to the target user from the plurality of recommendation candidates, the recommendation candidate information being stored in an accessible storage apparatus.

First Embodiment

Figure 1:
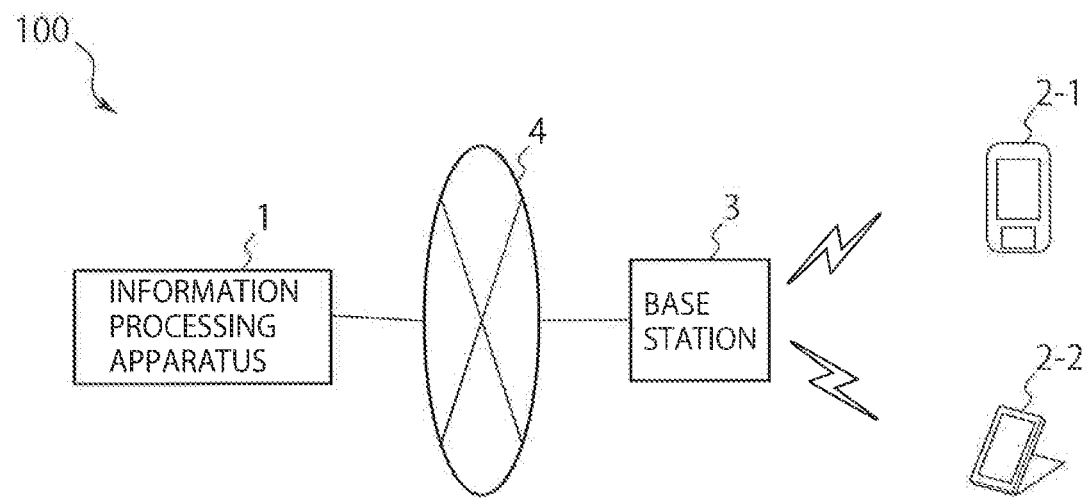
FIG. 1 is a diagram showing a configuration of an information processing system 100 of a first embodiment.

First, the first embodiment will be described. FIG. 1 is a diagram showing a configuration of an information processing system 100 of the first embodiment. As shown in FIG. 1, the information processing system 100 includes an information processing apparatus 1, terminal apparatuses 2-1 and 2-2, a base station 3, and a network 4.

The information processing apparatus 1 is connected to the base station 3 through the network 4. The base station 3 performs wireless communication with the terminal apparatuses 2-1 and 2-2. By this, the information processing apparatus 1 communicates with the terminal apparatuses 2-1 and 2-2 through the network 4 and the base station 3. The information processing apparatus 1 is, for example, a server.

The terminal apparatuses 2-1 and 2-2 can perform wireless communication with the base station 3, and communicate with the Information processing apparatus 1 through the base station 3. The terminal apparatuses 2-1 and 2-2 are, for example, mobile phones, tablet terminals, watch type terminals, goggle type terminals, or notebook PCs. The terminal apparatuses 2-1 and 2-2 are hereinafter collectively referred to as the terminal apparatuses 2.

When a terminal apparatus 2 displays a recommendation display screen based on a target user's operation, the terminal apparatus 2 transmits a recommendation request including identification information that identifies a target user, etc., to the information processing apparatus 1 through the network 4. When the information processing apparatus 1 receives the recommendation request from the terminal apparatus 2, the information processing apparatus 1 performs processes such as those described later and thereby generates recommended content for the target user and sends back the recommended content to the terminal apparatus 2. The terminal apparatus 2 presents the recommended content received from the information processing apparatus 1, to the target user.

Figure 2:
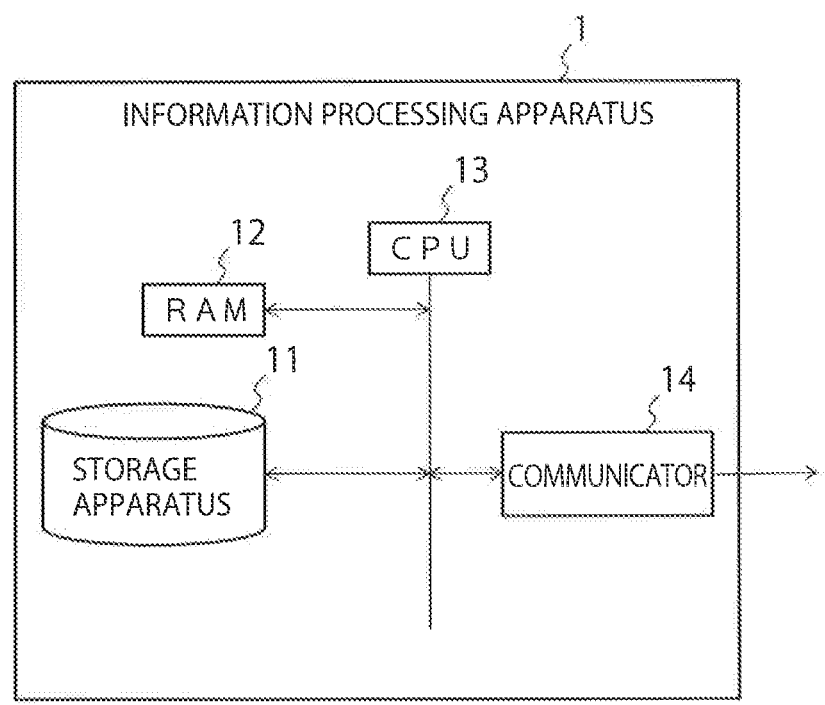
FIG. 2 is a diagram showing a hardware configuration of an information processing apparatus 1 of the first embodiment.

FIG. 2 is a diagram showing a hardware configuration of the Information processing apparatus 1 of the first embodiment.

The information processing apparatus 1 includes a storage apparatus 11, a RAM (Random Access Memory) 12, a CPU (Central Processing Unit) 13, and a communicator 14.

The storage apparatus 11 stores various types of data and a program to be executed by the CPU 13.

The RAM 12 temporarily stores information.

Figure 3:
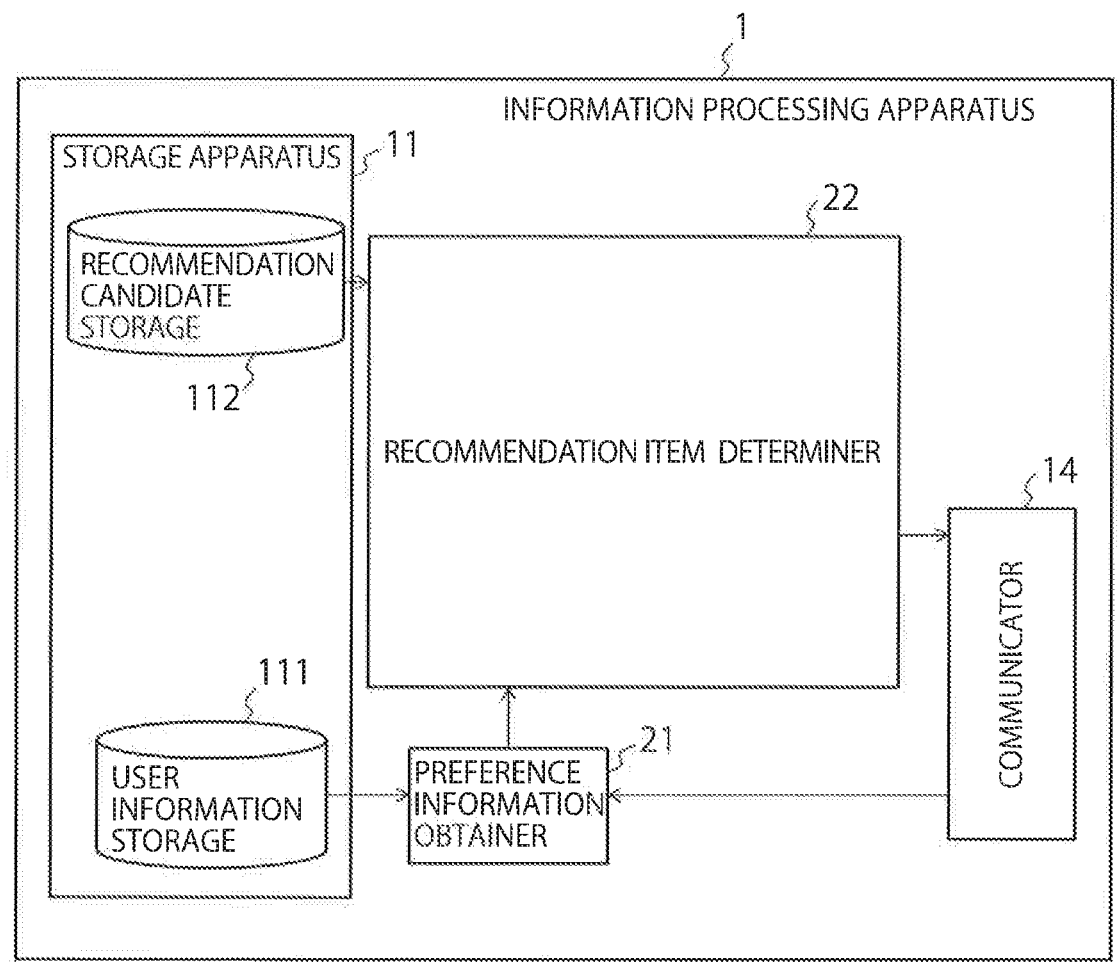
FIG. 3 is a diagram showing a logical configuration of the information processing apparatus 1 of the first embodiment.

The CPU 13 reads the program from the storage apparatus 11 into the RAM 12 and executes the program and thereby functions as a preference information obtainer 21 and a recommendation item determiner 22 which are shown in FIG. 3.

The communicator 14 communicates with the terminal apparatuses 2 through the network 4.

FIG. 3 is a diagram showing a logical configuration of the information processing apparatus 1 of the first embodiment. The storage apparatus 11 includes a user information storage 111 and a recommendation candidate storage 112.

In the user information storage 111, pieces of user identification information that identify users of the information processing system 100 and pieces of preference information indicating the preferences of the users that range over a plurality of genres are stored so as to be associated with each other. Here, the preference information is, for example, information registered by a user, information based on user's questionnaire answers, information obtained by pre-analyzing a user's action history, or information registered by a user for other services, but is not limited thereto. In addition, the preference information also includes user's hobbies. The information registered by the user includes demographic information indicating user's demographics. For example, in the user information storage 111, pieces of demographic information indicating users' demographics and pieces of user identification information are stored so as to be associated with each other. Here, the demographics is social and economic characteristics data of the user such as gender, age, area of residence, income, occupation, educational background, race, and family structure.

The recommendation candidate storage 112 stores pieces of recommendation candidate information about recommendation candidates. Here, the recommendation candidate information includes the name, genre, price, photo, expiration date, etc., of a recommendation candidate, but is not limited thereto. In addition, the recommendation candidate storage 112 also stores specific information required by the recommendation item determiner 22.

The preference information obtainer 21 obtains preference information indicating the preferences of a target user to which recommendation is to be made, the preferences ranging over a plurality of genres. Specifically, for example, the preference information obtainer 21 obtains, based on user identification Information transmitted from a terminal apparatus 2, preference information associated with the user identification information from the user information storage 111.

The recommendation item determiner 22 determines, using the preference information of the target user and the recommendation candidate information about a plurality of recommendation candidates ranging over a plurality of genres which is stored in the accessible storage apparatus 11, recommendation items to be recommended to the target user from the plurality of recommendation candidates. Specifically, for example, the recommendation item determiner 22 creates a recommendation item list to be presented to the target user, using the obtained preference information and the recommendation candidate information stored in the recommendation candidate storage 112. Then, the recommendation item determiner 22 allows the communicator 14 to transmit recommended content including the created recommendation item list to the terminal apparatus 2.

Figure 4:
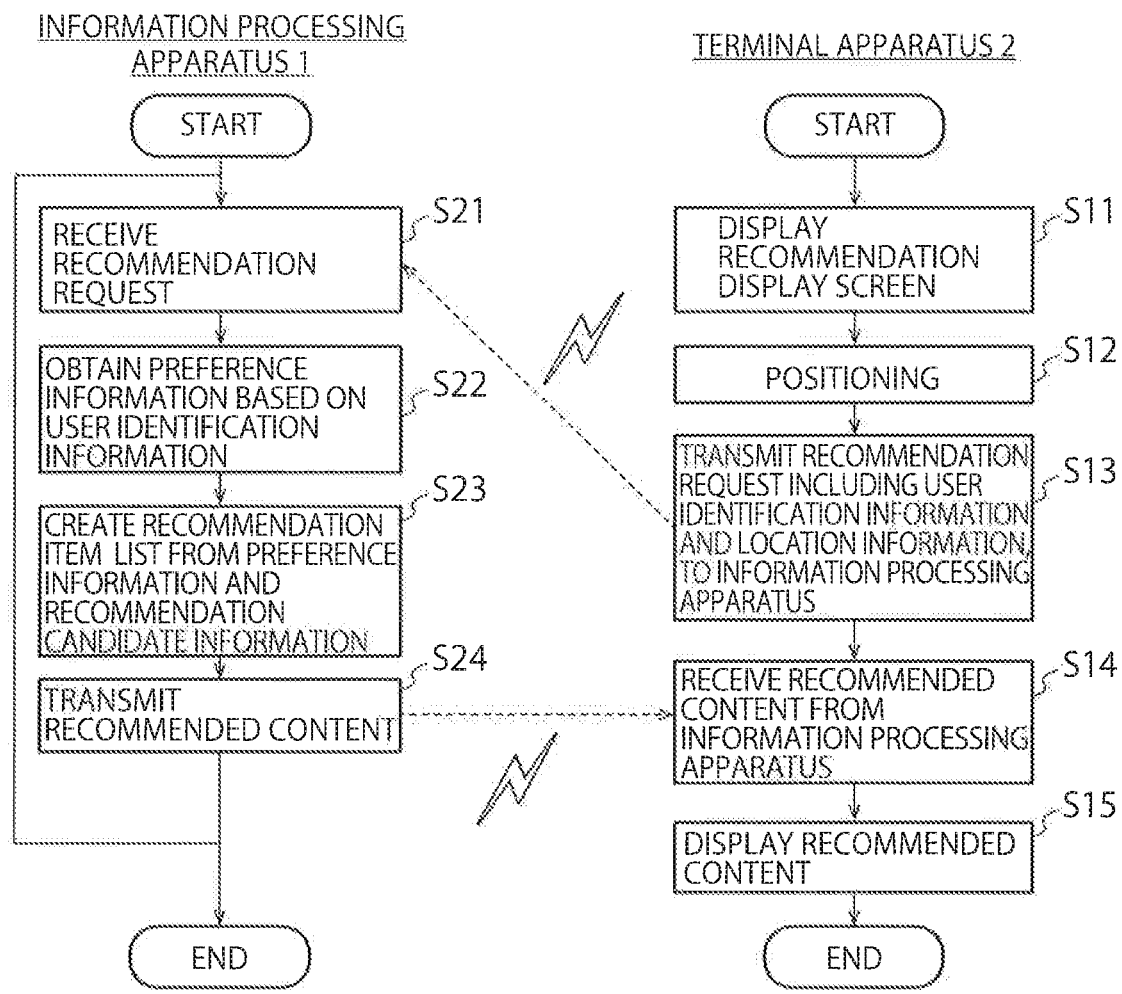
FIG. 4 is a flowchart showing an example of processes of the first embodiment.

FIG. 4 is a flowchart showing an example of processes of the first embodiment.

(Step S11) First, the terminal apparatus 2 displays a recommendation display screen, according to a user's operation.

(Step S12) Then, the terminal apparatus 2 measures the location of the terminal apparatus 2 using, for example, GPS (Global Positioning System). By this, the terminal apparatus 2 can obtain location information indicating the location of the terminal apparatus 2.

(Step S13) Then, the terminal apparatus 2 transmits a recommendation request including user identification information and the location information to the information processing apparatus 1.

(Step S21) Then, the communicator 14 of the information processing apparatus 1 receives the recommendation request transmitted from the terminal apparatus 2.

(Step S22) Then, the preference information obtainer 21 of the information processing apparatus 1 obtains preference Information, based on the user identification information included in the recommendation request received at step S21.

(Step S23) Then, the recommendation item determiner 22 of the information processing apparatus 1 creates a recommendation item list including a plurality of recommendation items, using the preference information obtained at step S22 and recommendation candidate information.

(Step S24) Then, the communicator 14 of the information processing apparatus 1 transmits recommended content including the recommendation item list to the terminal apparatus 2.

(Step S14) Then, the terminal apparatus 2 receives the recommended content from the information processing apparatus 1.

(Step S15) Then, the terminal apparatus 2 displays the recommended content received at step S14.

By this, a target user using the terminal apparatus 2 can know recommendation items that match his/her preferences and that range over a plurality of genres.

As described above, in the first embodiment, the preference information obtainer 21 obtains preference information indicating the preferences of a target user to which recommendation is to be made, the preferences ranging over a plurality of genres. The recommendation item determiner 22 determines, using the preference information of the target user and recommendation candidate information about a plurality of recommendation candidates ranging over a plurality of genres which is stored in the accessible storage apparatus 11, recommendation items to be recommended to the target user from the plurality of recommendation candidates.

By this, recommendation items are determined from recommendation candidates of a plurality of genres. Thus, recommendation items of a plurality of genres can be presented to the target user. As such, information ranging over a plurality of genres can be recommended to the target user.

Note that a visit sensor that detects a user's visit to a store may be provided in stores, and store identification information that identifies a store where a visit sensor is installed may be wirelessly transmitted to a terminal apparatus 2 used by a target user. Then, the terminal apparatus 2 may transmit a recommendation request Including the store identification information to the information processing apparatus 1. In that case, in the recommendation candidate storage 112 of the information processing apparatus 1, pieces of store identification information and pieces of store attribute information indicating the attributes (e.g., names and addresses) of stores are pre-stored so as to be associated with each other. Then, when the communicator 14 of the information processing apparatus 1 obtains the recommendation request including the store identification information, the recommendation item determiner 22 may read store attribute information associated with the store identification information from the recommendation candidate storage 112. By this, the information processing apparatus 1 can identify a store where the target user using the terminal apparatus 2 has visited and/or the location of the terminal apparatus 2, i.e., the location of the target user. Hence, even in the inside of a building where positioning by GPS is difficult, a store where the target user stays or a location can be estimated with high accuracy.

Note that the recommendation item determiner 22 may obtain location information indicating the location of the terminal apparatus 2 and determine recommendation items, further using the location information in addition to preference information and recommendation candidate information. For example, when the recommendation items are stores, the recommendation item determiner 22 may extract stores present within an area according to a location indicated by location information among pieces of recommendation candidate information in which preference Information matches preferences, and create a recommendation item list including the extracted stores. Here, the area according to a location indicated by location information may be a predetermined area with the location indicated by the location Information being at the center, or may be a commercial area including the location indicated by the location information. By this, the information processing apparatus 1 can recommend only stores present in a predetermined area from the location of the target user among stores that match the preferences of the target user.

Various variants are considered for processes performed by the recommendation item determiner 22 and for a method for holding information required for the processes. The variants will be described below.

(First Variant)

In this variant, to create a recommendation item list to be presented to a target user, an information processing apparatus 1b determines an estimated evaluation value of each recommendation candidate for the target user, using the evaluation values of recommendation candidates obtained by similar users similar to the target user, and creates a list in which the recommendation candidates are arranged in descending order of the determined estimated evaluation values.

Figure 5:
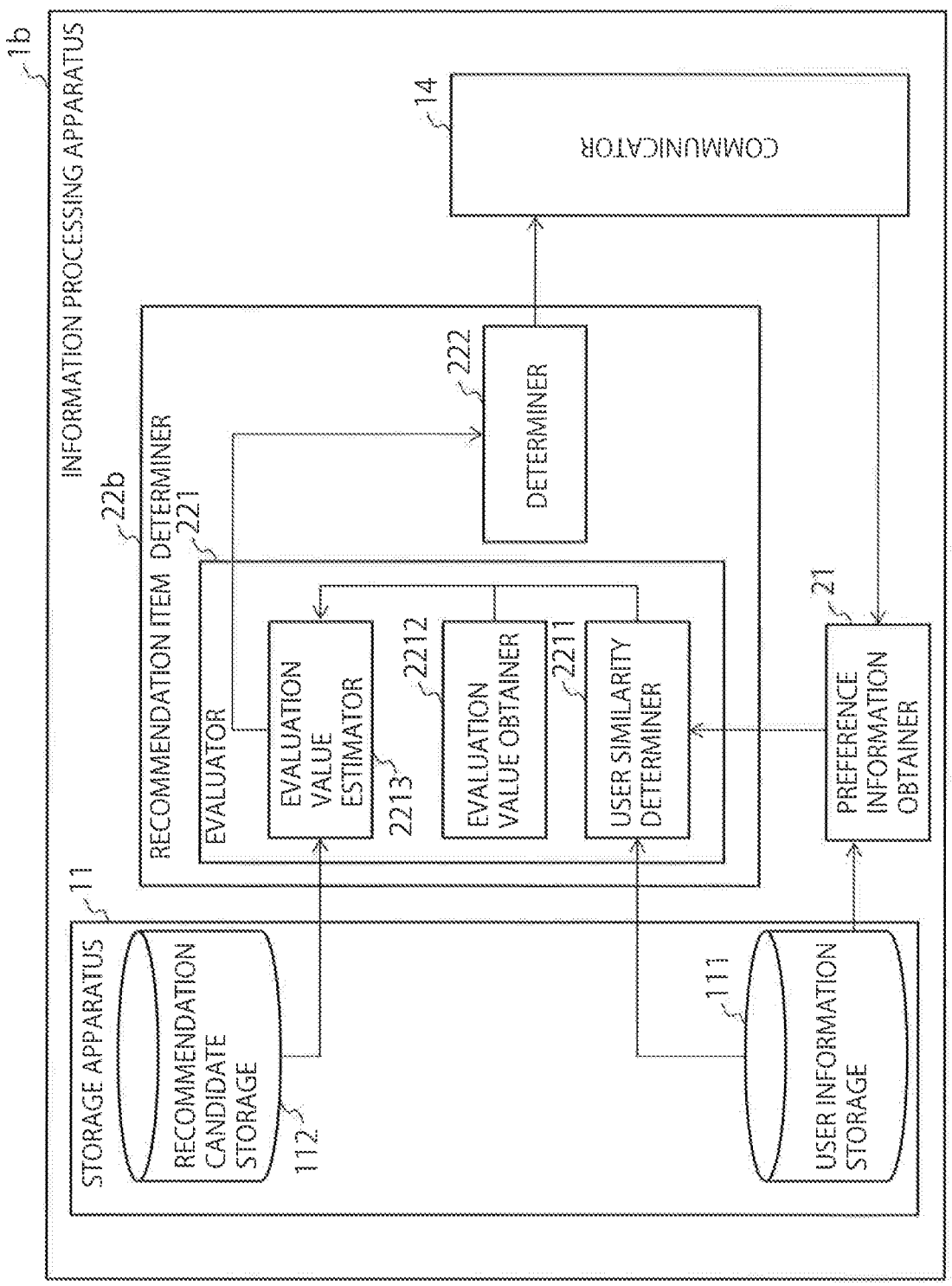
FIG. 5 is a diagram showing a logical configuration of an information processing apparatus 1b of a first variant of the first embodiment.

FIG. 5 is a diagram showing a logical configuration of the information processing apparatus 1b of a first variant of the first embodiment. Note that common components to those in FIG. 3 are denoted by the same reference signs and a specific description thereof is omitted. The configuration of the information processing apparatus 1b of the first variant of the first embodiment differs from the configuration of the information processing apparatus 1 of the first embodiment in that the recommendation item determiner 22 is changed to a recommendation item determiner 22b.

The recommendation item determiner 22b includes an evaluator 221 and a determiner 222.

The evaluator 221 determines an estimated evaluation value of each recommendation candidate for a target user.

The determiner 222 determines recommendation items to be recommended to the target user from a plurality of recommendation candidates, using the estimated evaluation values determined by the evaluator 221.

The evaluator 221 includes a user similarity determiner 2211, an evaluation value obtainer 2212, and an evaluation value estimator 2213.

The user similarity determiner 2211 determines, using a piece of preference information of the target user and pieces of preference information of a plurality of other users, similarities between the target user and the other users. Specifically, for example, the user similarity determiner 2211 reads attribute information of each user from a user information storage 111. The attribute information includes at least one of demographics, a user's action history, and information about the closeness of friendship on a social network with other users.

In addition, the user similarity determiner 2211 obtains preference information of each user which is obtained by a preference information obtainer 21. Then, the user similarity determiner 2211 determines similarities between the target user and other users, based on the read attribute information of each user and the obtained preference information of each user.

The similarity is, for example, an index that takes a numerical value between −1.0 and 1.0. The similarity is closer to 1.0 when users are more similar to each other, and is 0 when users are not similar to each other at all. In addition, when users have opposite preferences, the similarity may take a negative value. Various indices can be used for calculation of a similarity. For example, the user similarity determiner 2211 may use at least one of demographics (e.g., user's age and gender), preference information, a user's action history (e.g., a browsing history or a purchase history), and the closeness of friendship on a social network, for calculation of a similarity. The preference information may be obtained through a questionnaire from a user or may be estimated from a user's action history.

For example, the user similarity determiner 2211 may calculate the value of 0.5a×0.9b as a similarity. Here, the factor a is 1 for different genders and is 0 for the same gender, and the factor b is the absolute value of the difference between ages. Note that this is an example of calculation of a similarity based on age and gender, and thus, the similarity is not limited thereto.

For similarity calculation based on the preference Information, numerical values representing the strengths of preferences for various objects may be prepared for each user and a correlation coefficient between the numerical values may be used, or the cosine of an angle formed by vectors may be used, but the preference information is not limited thereto.

For the strengths of preferences, the strengths of preferences for each genre such as "reading", "movie", "fashion", "Italian restaurant", and "Japanese food" may be obtained through a questionnaire. In addition, when there is a mechanism for a user to evaluate recommendation candidates, an evaluation value for each recommendation candidate or a history of purchases, browsing, or the like, may be used or an evaluation value accumulated or averaged for each genre may be used. Here, the mechanism for a user to evaluate recommendation candidates includes, for example, five-level evaluation by the user or the pressing of the "like" button by the user.

As an example of computation, when the strengths of preferences of a first user for "reading", "movie", and "fashion" are (1, 2, 2), respectively, and the strengths of preferences of a second user are (0, 2, 4), respectively, a correlation coefficient of 0.87 between the two data strings may be calculated as a similarity. Alternatively, a cosine of 0.89 of an angle formed by these vectors may be calculated as a similarity. In addition, when a cosine of an angle formed by vectors is used, averages of all users may be computed in advance and an angle of vectors obtained as a result of subtracting the averages may be used.

In addition, an average value may be used for a component for which user's preferences are unknown. In addition, when an average value is subtracted, a component for which user's preferences are unknown is zero.

If the averages of the preferences of all users are (0, 1.5, 3), the strengths of the preferences of the first user obtained as a result of subtracting the averages and the strengths of the preferences of the second user obtained as a result of subtracting the averages are (1, 0.5, −1) and (0, 0.5, 1), respectively. In this case, a cosine of −0.45 of an angle formed by these vectors may be calculated as a similarity.

The evaluation value obtainer 2212 obtains evaluation values of a plurality of recommendation candidates for a plurality of other users. For example, the evaluation value obtainer 2212 performs computation for each set of a user and a recommendation candidate when an evaluation value of the recommendation candidate for the user can be computed.

For example, when the user can evaluate a commodity or the like by five-level evaluation, the evaluation value obtainer 2212 may use that evaluation value. Alternatively, points may be preset for feedback such as the pressing of the "like" button by the user and the pressing of the "dislike" button by the user, and for actions such as "purchase" and "browsing". For example, points may be set such that the pressing of the "like" button is 2 points, the pressing of the "dislike" button is −2 points, "purchase" is 3 points, and "browsing" is 1 point. Then, the evaluation value obtainer 2212 may use the sum total of points for feedback or actions performed, as an evaluation value.

In addition, the evaluation value obtainer 2212 may treat a recommendation candidate for which the user has not performed any evaluation or action, as "unevaluable". In addition, for an evaluation value, a value obtained by subtracting an average of the evaluation values of the user may be used as an evaluation value. By doing so, the influence of bias of evaluation values by the user can be reduced.

The evaluation value estimator 2213 determines an estimated evaluation value for each recommendation candidate for the target user, using the determined plurality of similarities and the obtained plurality of evaluation values. Specifically, for example, the evaluation value estimator 2213 estimates an estimated evaluation value of each recommendation candidate i for a target user v, based on the evaluation values of each recommendation candidate I for users similar to the target user v.

Here, the evaluation value estimator 2213 uses, for example, as the similar users, users, the number of which is up to a preset upper limit, in descending order of similarities to the target user v which are determined by the user similarity determiner 2211. At this time, the evaluation value estimator 2213 may exclude users that are determined by the evaluation value obtainer 2212 to be unevaluable, and then use users, the number of which is up to the upper limit. In addition, users with negative similarities may be excluded.

Using a set N of similar users thus obtained, when the similarity of each similar user u is sim_u and the evaluation value of a target recommendation candidate is val_u, the evaluation value estimator 2213 may use the weighted sum $S = \Sigma u \in N \cdot slm\_u \times val\_u$, as the estimated evaluation value of the target recommendation candidate for the target user v. Alternatively, the evaluation value estimator 2213 may use $S/(\Sigma u \in N |sim\_u|)$ which is the division of the weighted sum S by the sum total of the absolute values of the similarities, as the estimated evaluation value of the target recommendation candidate for the target user v. An example of computation for the latter case will be described using FIG. 6.

Figure 6:
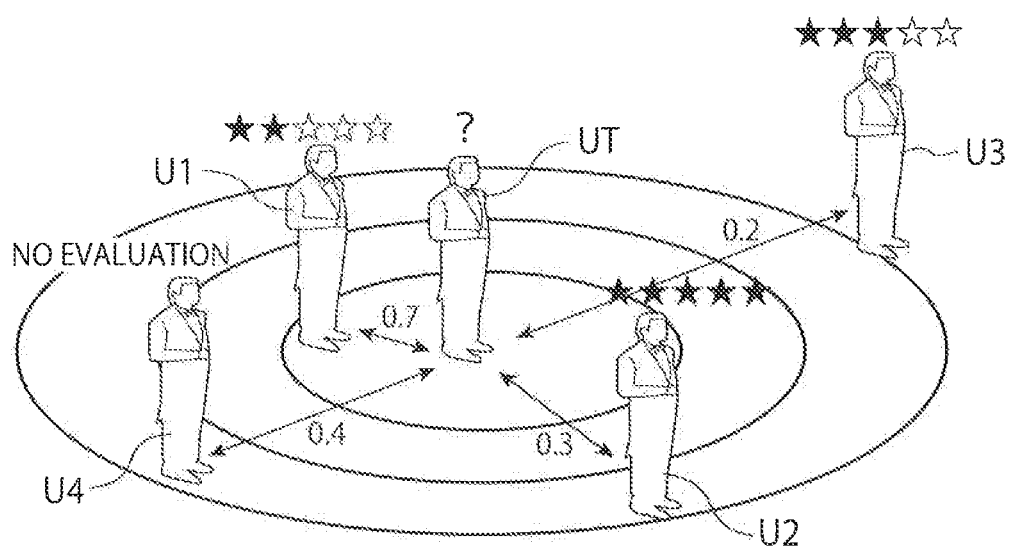
FIG. 6 is a diagram for describing an example of computation of an estimated evaluation value of a target recommendation candidate for a target user.
Figure 6:
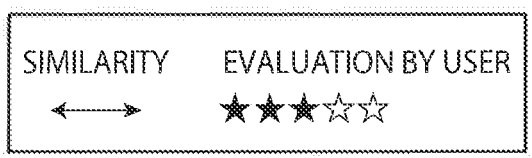

FIG. 6 is a diagram for describing an example of computation of an estimated evaluation value of a target recommendation candidate for a target user. As shown in FIG. 6, for example, the estimated evaluation value of the target recommendation candidate is 2 for a first user U1, 5 for a second user U2, and 3 for a third user U3. In addition, a fourth user U4 has not made an evaluation. The similarity to a target user UT is 0.7 for the first user U1, 0.3 for the second user U2, 0.2 for the third user U3, and 0.4 for the fourth user U4.

Since the fourth user U4 has not made an evaluation, as an example, the fourth user U4 is ignored. At this time, the estimated evaluation value of the target recommendation candidate for the target user UT is $(0.7 \times 2 + 0.3 \times 5 + 0.2 \times 3)/(0.7+0.3+0.2) \approx 2.917$.

Subsequently, the determiner 222 creates, for example, a recommendation item list in which recommendation candidates are arranged in descending order of the determined estimated evaluation values. Note that the recommendation item list may include all recommendation candidates, or may be a list including a certain number of recommendation candidates in descending order of estimated evaluation value, or may be a list including only recommendation candidates with estimated evaluation values greater than or equal to a certain value, or may be a list including items that meet either one of the former two conditions in descending order of estimated evaluation value.

As described above, in the information processing apparatus 1b of the first variant, the user similarity determiner 2211 determines, using a piece of preference information of a target user and pieces of preference information of a plurality of other users, similarities between the target user and the other users. In addition, the evaluation value obtainer 2212 obtains an evaluation value of each of a plurality of recommendation candidates for the plurality of other users. Then, the evaluation value estimator 2213 determines an estimated evaluation value of each recommendation candidate for the target user, using the determined plurality of similarities and the obtained plurality of evaluation values. The determiner 222 determines recommendation items to be recommended to the target user from the plurality of recommendation candidates, using the estimated evaluation values determined by the evaluation value estimator 2213.

By this, the evaluation values obtained by other users with high similarities to the target user are more reflected in the estimated evaluation values obtained by the target user. Thus, recommendation items in which the preferences of the target user are more reflected can be presented to the target user.

(Second Variant)

Next, a second variant will be described. In the second variant, in order to create a recommendation item list to be presented to a user, recommendation candidates that match the preference information of a target user are selected and a recommendation item list is created using the selected recommendation candidates.

Figure 7:
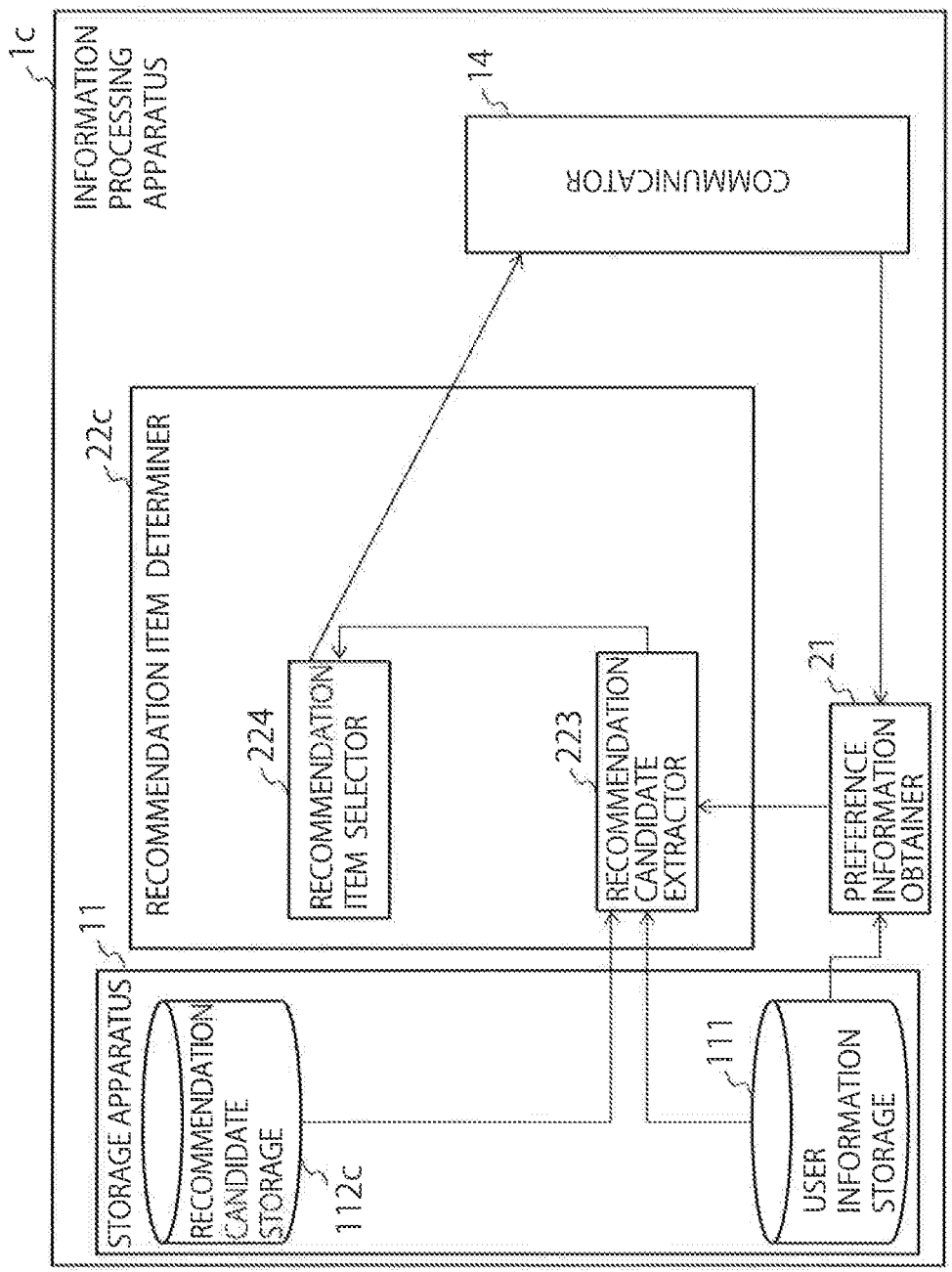
FIG. 7 is a diagram showing a logical configuration of an information processing apparatus 1c of a second variant of the first embodiment.

FIG. 7 is a diagram showing a logical configuration of an information processing apparatus 1c of the second variant of the first embodiment. Note that common components to those in FIG. 5 are denoted by the same reference signs and a specific description thereof is omitted. The configuration of the information processing apparatus 1c of the second variant of the first embodiment differs from the configuration of the information processing apparatus 1b of the first variant of the first embodiment in that the recommendation candidate storage 112 is changed to a recommendation candidate storage 112c, and the recommendation item determiner 22b is changed to a recommendation item determiner 22c.

The recommendation candidate storage 112c stores, in addition to the information saved in the recommendation candidate storage 112 of the first variant, attributes ranging over a plurality of genres which are provided to a plurality of recommendation candidates, in association with each recommendation candidate. Specifically, for example, in the recommendation candidate storage 112c, information indicating whether to have each of a plurality of preset attributes is stored so as to be associated with each recommendation candidate.

The "information indicating whether to have each of a plurality of attributes" is, for example, information indicating whether to have an attribute that the recommendation candidate is "Italian food", an attribute that the recommendation candidate is "classical music", an attribute that the "target customer segment is women", and an attribute that the "target customer age group is an F1/M1 group (20- to 34-year-old women or 20- to 34-year-old men)".

The recommendation item determiner 22c compares the preference information of a target user to which recommendation is to be made, with attributes ranging over a plurality of genres and associated with each of a plurality of recommendation candidates, and determines recommendation items to be recommended to the target user from the plurality of recommendation candidates, according to the comparison results. As an example thereof, the recommendation item determiner 22c compares demographic information indicating the demographics of the target user in addition to the preference information of the target user, with attributes ranging over a plurality of genres and associated with each of a plurality of recommendation candidates, and determines recommendation items to be recommended to the target user from the plurality of recommendation candidates, according to the comparison results.

Here, the recommendation item determiner 22c includes a recommendation candidate extractor 223 and a recommendation item selector 224.

The recommendation candidate extractor 223 compares the demographic information and preference information of a target user to which recommendation is to be made, with information indicating whether to have each of a plurality of attributes, and extracts recommendation items to be recommended to the target user from a plurality of recommendation candidates, according to the comparison results.

Specifically, for example, the recommendation candidate extractor 223 extracts, among the recommendation candidates, recommendation candidates whose genders of target customer segments and whose age groups match the gender and age of the target user, and whose any of associated attributes about preference matches preferences indicated by the preference information of the target user. Here, the attributes about preference are, for example, "Italian food", "French food", "Chinese food", "Japanese food", and "snack". A user's preference for an attribute is determined by the fact that the user answers in a questionnaire that he/she likes an item with the attribute, or the fact that the frequency of visits to stores with the attribute is higher than or equal to a threshold value, or the fact that the user, for example, frequently purchases or browses commodities with the attribute in an action history (e.g., a purchase history or a browsing history).

Note that, in the case in which there is information on dependent family members such as the case in which the user answers to information about dependent family members in questionnaire answers, the recommendation candidate extractor 223 may determine that there is a match, when either of the information on the user or the information on the dependent family members matches.

In addition, for a matching determination, different determination methods may be used for different genres of recommendation candidates such as "restaurant", "fashion", and "movie". Particularly, for an attribute used when determining whether preference matches, it is preferred to use different attributes for different genres.

Subsequently, the recommendation item selector 224, for example, selects final recommendation items from the recommendation candidates extracted by the recommendation candidate extractor 223, and creates a list of the selected recommendation items. For example, the recommendation item selector 224 may randomly select a predetermined number of recommendation items which is an upper limit, from the extracted recommendation candidates. Note, however, that if recommendation items are completely randomly selected, then recommendation candidates of a genre with a large number of recommendation candidates account for a substantial portion of the higher-ranking of the recommendation item list, which reduces the diversity of recommendation items. To avoid this, for example, an upper limit may be set for the number of recommendation items for each genre (e.g., "food", "Western-style cakes", "Japanese-style cakes", "restaurants", "cafes", and "Japanese taverns"). Then, when the recommendation item selector 224 randomly selects recommendation candidates, if a selected recommendation candidate belongs to a genre that has already reached its upper limit, then the recommendation item selector 224 may temporarily exclude the selected recommendation candidate and randomly reselect a recommendation candidate from the remaining recommendation candidates. Thereafter, when the recommendation item selector 224 runs out of the remaining recommendation candidates, the recommendation item selector 224 may include again the recommendation candidate having been excluded once and completely randomly select recommendation candidates until the number of selected recommendation candidates reaches a preset specified number of recommendation candidates. By doing so, the diversity of genres of the higher-ranking recommendation items included in the recommendation item list can be improved.

As described above, the information processing apparatus 1c of the second variant includes the recommendation item determiner 22c that compares the preference information of a target user with attributes ranging over a plurality of genres and associated with each of a plurality of recommendation candidates, and determines recommendation items to be recommended to the target user from the plurality of recommendation candidates, according to the comparison results. By this, recommendation candidates whose attributes match the preferences of the target user are determined to be recommendation items. By this, the information processing apparatus 1c can present the recommendation items in which the preferences of the target user are reflected, to the target user.

(Third Variant)

Next, a third variant will be described. In the second variant, the recommendation item determiner 22c makes a 0/1 determination as to whether the attributes of a recommendation candidate match the preferences of a target user. In the third variant, on the other hand, a recommendation item determiner 22d determines the degrees of matching of user's preference with respect to a recommendation candidate as a continuous numerical value, and creates a recommendation item list in which recommendation items are arranged in descending order of the degree of matching.

Figure 8:
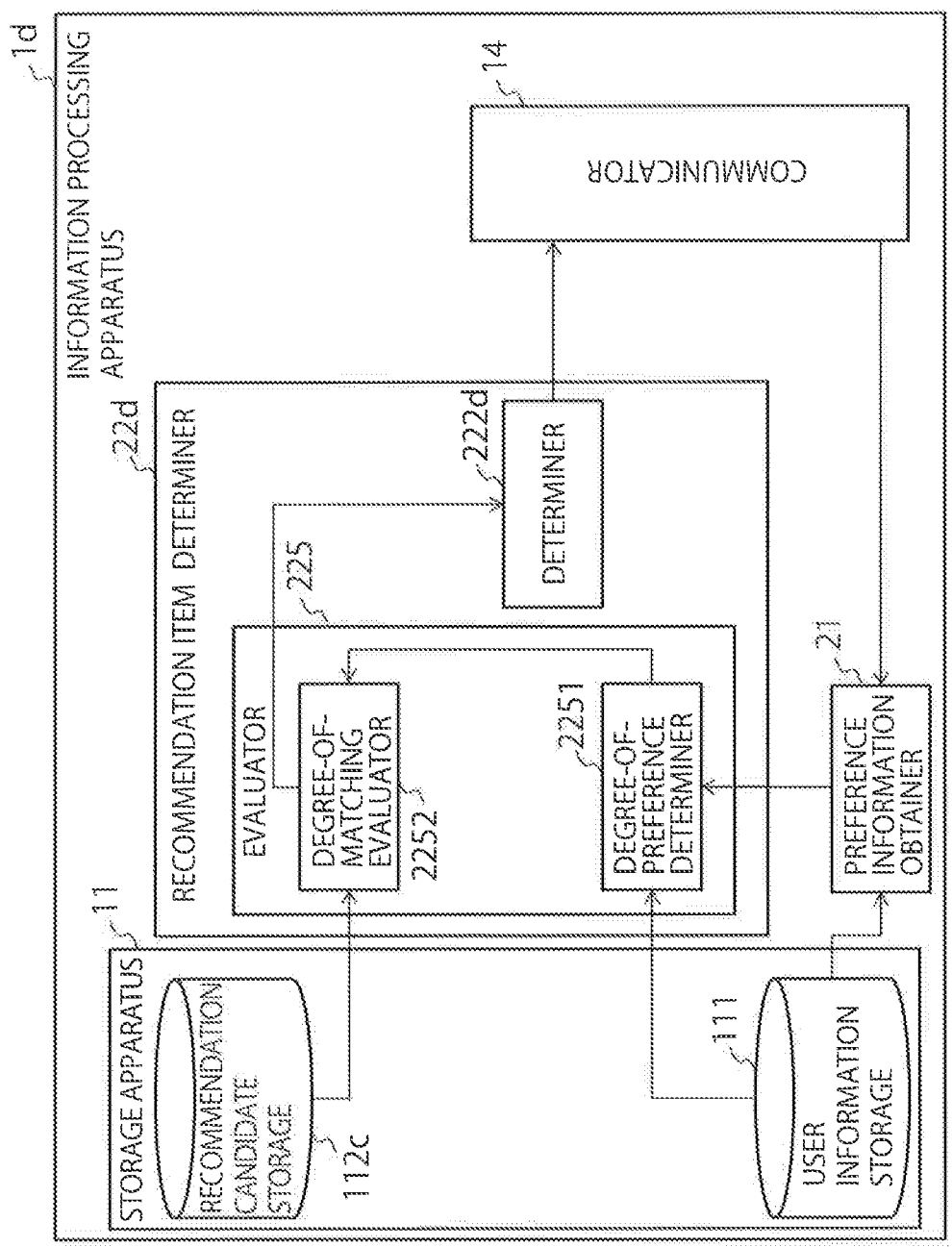
FIG. 8 is a diagram showing a logical configuration of an information processing apparatus 1d of a third variant of the first embodiment.

FIG. 8 is a diagram showing a logical configuration of an information processing apparatus 1d of the third variant of the first embodiment. Note that common components to those in FIG. 7 are denoted by the same reference signs and a specific description thereof is omitted. The configuration of the information processing apparatus 1d of the third variant of the first embodiment differs from the configuration of the information processing apparatus 1c of the second variant of the first embodiment in that the recommendation item determiner 22c is changed to the recommendation item determiner 22d.

The recommendation item determiner 22d includes an evaluator 225 and a determiner 222d.

The evaluator 225 evaluates, for each recommendation candidate, the degree of matching of user's preference with respect to the recommendation candidate. Here, the evaluator 225 includes a degree-of-preference determiner 2251 and a degree-of-matching evaluator 2252.

The degree-of-preference determiner 2251 determines the degree of preference of the target user for attributes ranging over a plurality of genres and associated with each of a plurality of recommendation candidates, based on the target user's answers or action history (e.g., a purchase history or a browsing history).

The degree-of-matching, evaluator 2252 evaluates, for each recommendation candidate, the degree of matching of user's preference with respect to the recommendation candidate, using the attributes ranging over a plurality of genres and associated with each recommendation candidate and the degree of preference of the target user for each attribute.

The determiner 222d determines recommendation items to be recommended to the target user, using the above-described degree of matching of user's preference with respect to each recommendation candidate. For example, the determiner 222d creates a list of recommendation items which are arranged in descending order of the degree of preference for each recommendation candidate.

Figure 9:
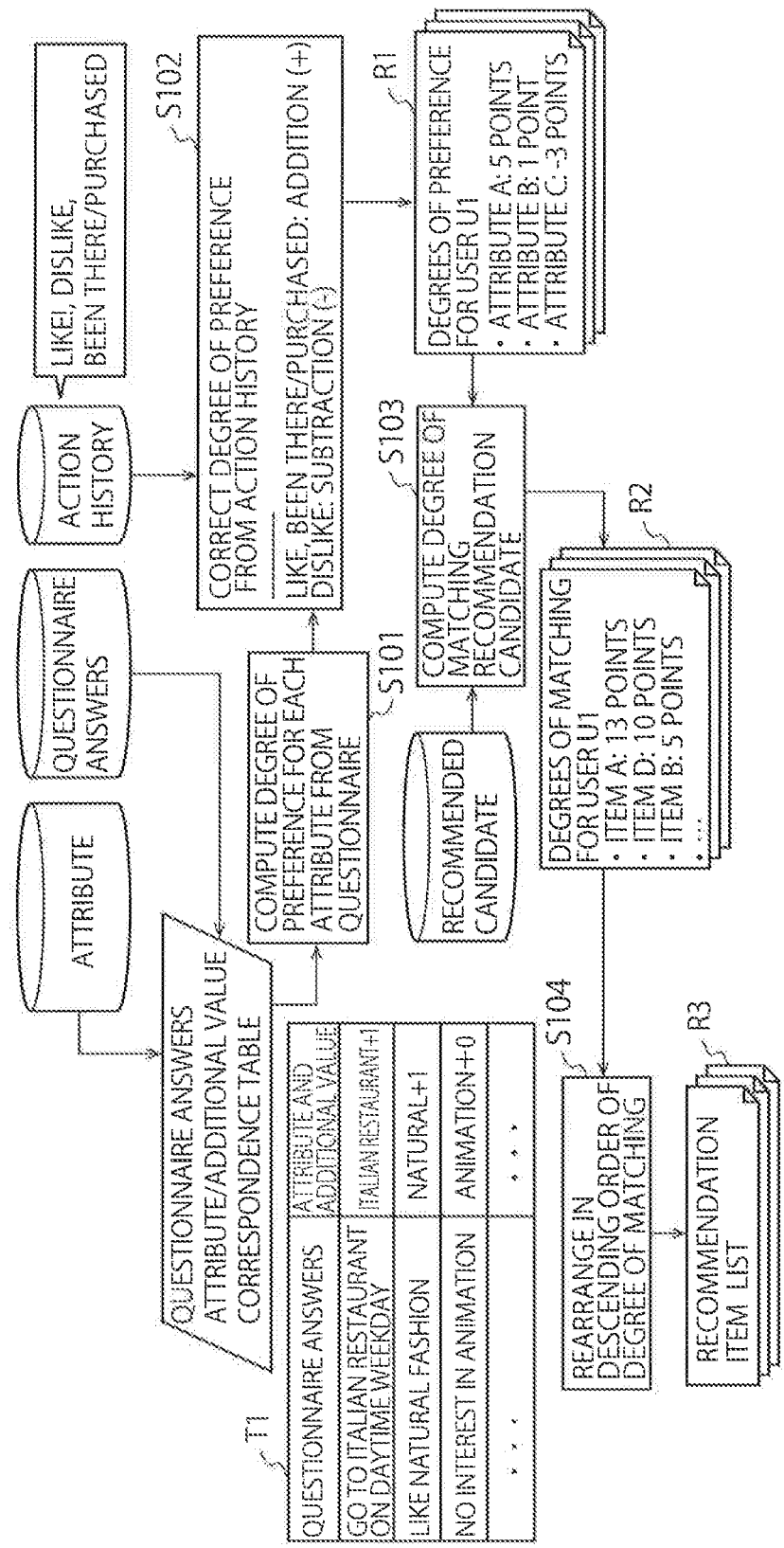
FIG. 9 is a diagram showing an example of the flow of processes of the third variant of the first embodiment.

An example of processes performed by the degree-of-preference determiner 2251 will be described below using FIG. 9. FIG. 9 is a diagram showing an example of the flow of processes of the third variant of the first embodiment.

In the example of FIG. 9, a storage apparatus 11 holds a correspondence table T1 between questionnaire answers and attributes/additional values. In the correspondence table T1 between questionnaire answers and attributes/additional values, an attribute to which the degree of preference is added and an amount of addition thereof are associated with each questionnaire answer.

(Step S101) First, the degree-of-preference determiner 2251 computes the degree of preference for each attribute by adding a corresponding additional value to an attribute associated with a questionnaire answer by referring to the correspondence table T1 between questionnaire answers and attributes/additional values.

(Step S102) Then, when a target user has purchased or evaluated (e.g., the pressing of the "like" button or the pressing of "dislike" button) a given recommendation candidate, the degree-of-preference determiner 2251 adjusts the degree of preference for an attribute associated with the recommendation candidate.

This adjustment is made such that, for example, a preset numerical value is added for positive evaluation (e.g., the pressing of the "like" button), purchase, or the like, and a preset numerical value is subtracted for negative evaluation (e.g., the pressing of the "dislike" button). The degree-of-preference determiner 2251 repeats this correction for all actions included in an action history.

By this, as shown in results R1 of FIG. 9, sets of an attribute and the degree of preference are obtained for each user. As such, the degree-of-preference determiner 2251 can compute, for each user, the degree of preference of the user for each attribute by performing processes such as those described above.

(Step S103) Then, the degree-of-matching evaluator 2252 computes, for each recommendation candidate, the degree of matching of user's preference with respect to the recommendation candidate. By this, as shown in results R2 of FIG. 9, the degree of matching for each recommendation candidate can be obtained for each user. FIG. 9 shows an item A, an item D, and an item B as an example of recommendation candidates, and the degrees of matching for the item A, the item D, and the item B are 13 points, 10 points, and 5 points, respectively.

As an example of a computation method, the degree-of-matching evaluator 2252 computes the sum total of the degrees of preference of the user for attributes assigned to a recommendation candidate, as the degree of matching of user's preference with respect to the recommendation candidate. This is equivalent to the computation of an inner product of a first vector indicating whether each attribute assigned to the recommendation candidate is present, and a vector of the degree of preference of the user for each attribute. Here, the first vector is a vector in which the presence and absence of each attribute are assigned to different dimensional components. In the first vector, when an attribute is assigned, a corresponding component is 1, and when an attribute is not assigned, a corresponding component is 0.

Furthermore, as another method, the degree-of-matching evaluator 2252 may compute a cosine similarity between the above-described first vector and a second vector representing the degree of preference of the user for each attribute.

In addition, the degree-of-matching evaluator 2252 may determine, for each recommendation candidate, average values of the components of a second vector, and compute a cosine similarity between a third vector obtained by subtracting a corresponding average value from the second vector, and a first vector. In addition, the degree-of-matching evaluator 2252 may determine, for each user, average values of the components of a second vector and compute a cosine similarity between a fourth vector obtained by subtracting a corresponding average value from the second vector, and a first vector.

(Step S104) Then, the determiner 222d creates a recommendation item list in which recommendation items are arranged in descending order of the degree of matching. By this, as shown in a result R3 of FIG. 9, a recommendation item list is obtained for each user.

Note that the determiner 222d may include all recommendation candidates in the recommendation item list or may include a certain number of recommendation candidates in descending order of the degree of matching. In addition, the determiner 222d may create a recommendation item list using only recommendation candidates whose degrees of matching are greater than or equal to a certain value, or may create a recommendation item list including recommendation candidates that meet either one of the former two conditions in descending order of the degree of matching.

As described above, in the third variant, the degree-of-preference determiner 2251 determines the degree of preference of the target user for attributes ranging over a plurality of genres and associated with each of a plurality of recommendation candidates, based on the target user's answers or action history. Then, the degree-of-matching evaluator 2252 evaluates, for each recommendation candidate, the degrees of matching of target user's preference with respect to the attributes of the recommendation candidate, using the attributes ranging over a plurality of genres and associated with each recommendation candidate and the degree of preference of the target user for each attribute. Then, the determiner 222d determines recommendation items to be recommended to the target user, using the above-described degree of matching of user's preference with respect to each recommendation candidate.

By this, recommendation candidates with high degrees of matching can be determined to be recommendation items, enabling to present the recommendation items that more match the preferences of the target user, to the target user.

(Fourth Variant)

Next, a fourth variant will be described. Recommendation items are determined by a single method of the first to third variants. In the fourth variant, on the other hand, a final recommendation item list is created by alternately arranging recommendation items which are determined by a plurality of methods.

Figure 10:
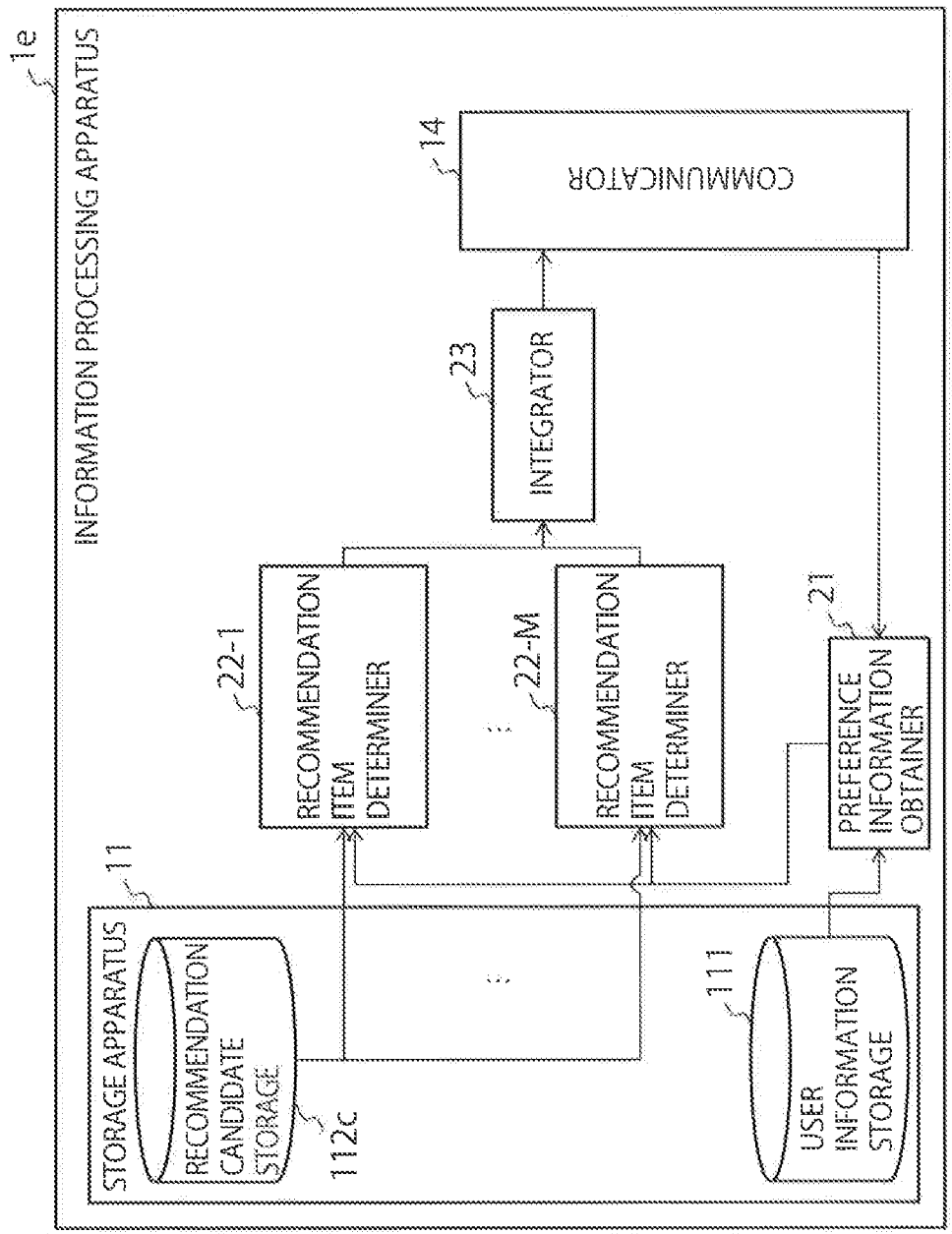
FIG. 10 is a diagram showing a logical configuration of an information processing apparatus 1e of a fourth variant of the first embodiment.

FIG. 10 is a diagram showing a logical configuration of an Information processing apparatus 1e of the fourth variant of the first embodiment. Note that common components to those in FIG. 8 are denoted by the same reference signs and a specific description thereof is omitted. The configuration of the information processing apparatus 1e of the fourth variant of the first embodiment differs from the configuration of the information processing apparatus 1d of the third variant of the first embodiment in that the recommendation item determiner 22d is removed, and recommendation item determiners 22-1, . . . , 22-M (M is a positive integer) and an integrator 23 are added.

Each of the M recommendation item determiners 22-l (l is an integer from 1 to M) including the recommendation item determiners 22-1, . . . , 22-M has a configuration of any one of the recommendation item determiners 22b, 22c, and 22d of the first to third variants.

Note that some of the recommendation item determiners 22-i may determine recommendation items by other methods. Note also that the configuration is not limited to that described above, and the information processing apparatus 1e of the fourth variant may include at least two different recommendation item determiners among the recommendation item determiners 22b, 22c, and 22d of the first to third variants.

The integrator 23 determines items to be recommended to a target user by integrating recommendation items determined by the plurality of recommendation item determiners 22-i. For example, the integrator 23 creates a recommendation item list in which recommendation items determined by the plurality of recommendation item determiners 22-i are arranged alternately.

For example, the case is assumed in which, when M is 3, a recommendation item determiner 22-1 is the recommendation item determiner 22b of the first variant, a recommendation item determiner 22-2 is the recommendation item determiner 22c of the second variant, and a recommendation item determiner 22-3 is the recommendation item determiner 22d of the third variant.

An example will be described in which in the above-described case the recommendation item determiner 22-1 creates a first recommendation item list "A, B, and C", the recommendation item determiner 22-2 creates a second recommendation item list "E, F, and G", and the recommendation item determiner 22-3 creates a third recommendation item list "I, J, and K". In that example, the integrator 23 alternately arranges "A, B, and C", "E, F, and G", and "I, J, and K" to create a recommendation item list in which recommendation items are arranged in the order of "A, E, I, B, F, J, C, G, and K".

Note, however, that there may be a case in which the same recommendation item is included in the first to third recommendation item lists, and thus, when there is a recommendation item that has already been selected upon selecting, by the integrator 23, recommendation items to be arranged in turn from the higher-ranking, that recommendation item may be skipped and the next recommendation item may be selected. For example, when the first to third recommendation item lists "A, B, and C", "E, A, and G", and "I, J, and K" are provided, for the next one to "A, E, I, B", since "A" in the second recommendation item list is already selected, this "A" is skipped and the next "G" is selected, resulting in "A, E, I, B, G, . . . ". The integrator 23 may create a recommendation item list such that the number of recommendation items included in the recommendation Item list to be created is less than or equal to a pre-specified number of recommendation items.

As described above, the information processing apparatus 1e according to the fourth variant includes at least two different recommendation item determiners among the recommendation item determiners 22b, 22c, and 22d of the first to third variants; and the integrator 23 that determines items to be recommended to a target user by integrating recommendation items determined by the plurality of recommendation item determiners.

By this, in a technique for creating recommendation, recommendation items having different trends can be determined using different pieces of information. Thus, a variety of recommendation items can be presented to a user.

(Fifth Variant)

Next, a fifth variant will be described. The information processing apparatus 1e according to the fourth variant determines items to be recommended to a target user by integrating recommendation items determined by different recommendation item determiners. An information processing apparatus if according to the fifth variant, on the other hand, determines recommendation items using estimated evaluation values determined by the evaluator 221 of the first variant and the degrees of matching evaluated by the evaluator 225 of the third variant.

Figure 11:
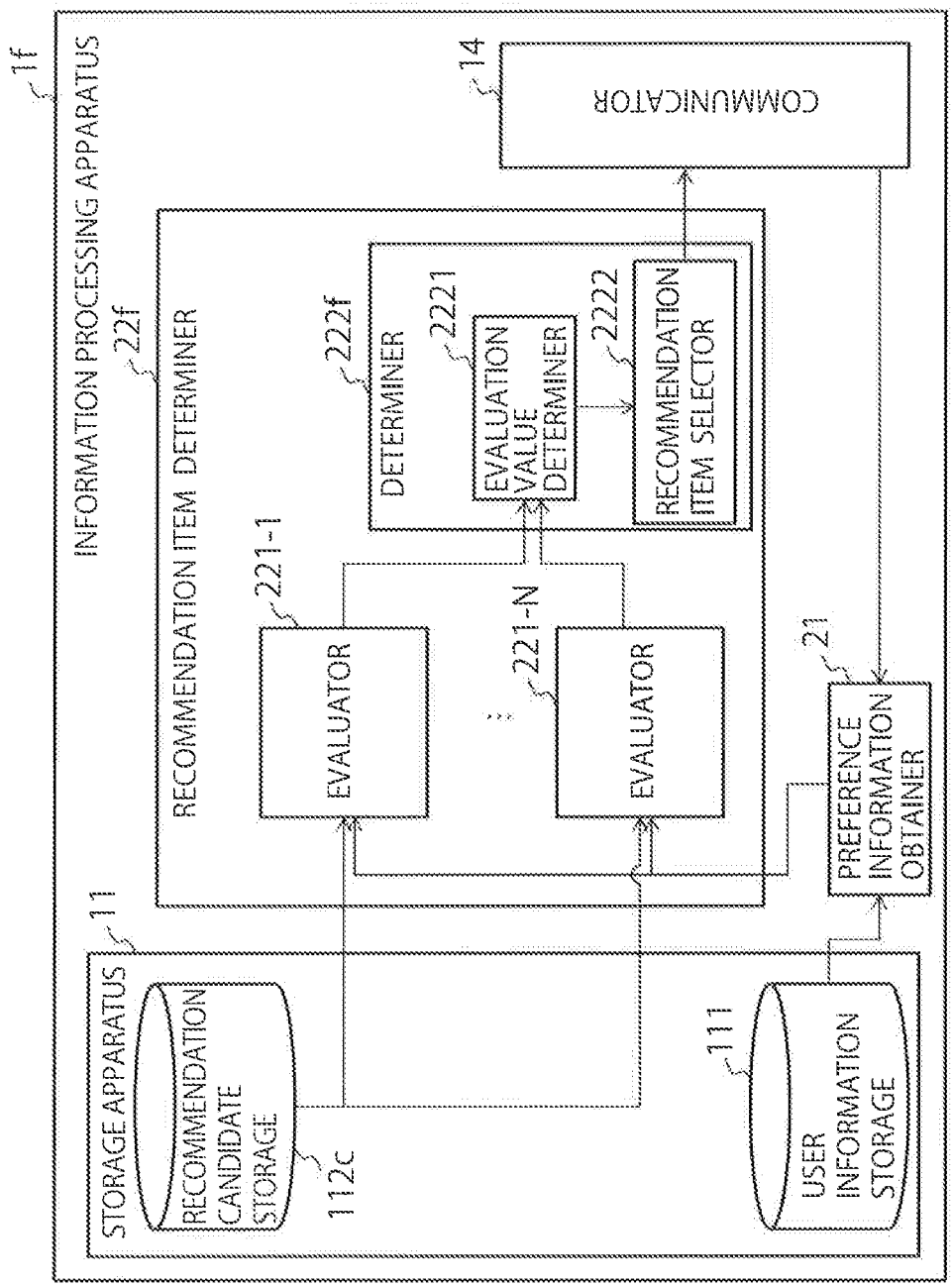
FIG. 11 is a diagram showing a logical configuration of an information processing apparatus 1f of a fifth variant of the first embodiment.

FIG. 11 is a diagram showing a logical configuration of the information processing apparatus 1f of the fifth variant of the first embodiment. Note that common components to those in FIG. 8 are denoted by the same reference signs and a specific description thereof is omitted. The configuration of the information processing apparatus 1f of the fifth variant of the first embodiment differs from the configuration of the information processing apparatus 1d of the third variant of the first embodiment in that the recommendation item determiner 22d is changed to a recommendation item determiner 22f.

The recommendation item determiner 22f includes evaluators 221-1, ..., 221-N (N is a positive integer) and a determiner 222f.

Each of the N evaluators 221-j (j is an integer from 1 to N) including the evaluators 221-1, ..., 221-N has a configuration of either one of the evaluator 221 of the first variant and the evaluator 225 of the third variant. Note that the evaluators 221-j may determine estimated evaluation values by different methods than those of the evaluator 221 of the first variant and the evaluator 225 of the third variant.

The determiner 222f determines recommendation items to be recommended to a target user from a plurality of recommendation candidates, using an estimated evaluation value of each recommendation candidate for the target user which is estimated by the evaluator 221 of the first variant and the degrees of matching of user's preference with respect to the recommendation candidates which are evaluated by the evaluator 225 of the third variant. More specifically, the determiner 222f determines a second estimated evaluation value using an estimated evaluation value of each recommendation candidate for the target user and the degree of matching of preference with respect to each recommendation candidate for the target user, and determines recommendation items to be recommended to the target user, based on the second estimated evaluation values. Here, the determiner 222f includes an evaluation value determiner 2221 and a recommendation item selector 2222.

The evaluation value determiner 2221 determines a second estimated evaluation value, using an estimated evaluation value of each recommendation candidate for the target user and the degree of matching of user's preference with respect to each recommendation candidate for the target user.

For example, the case is assumed in which the evaluators 221-1, ..., 221-N determine values $v1, \ldots, vN$ as estimated evaluation values or the degrees of matching. In that case, the evaluation value determiner 2221 computes, for example, second estimated evaluation values $f(v1, \ldots, vN)$ using a pre-given function f. Using a pre-given constant $c1, \ldots, cN$, the function f is, for example, $f(v1, \ldots, vN) = c1 \times v1 + \ldots + cN \times vN$.

The recommendation item selector 2222 selects recommendation items to be recommended to the target user from a plurality of recommendation candidates, based on the second estimated evaluation values $f(v1, \ldots, vN)$. For example, the recommendation item selector 2222 creates a recommendation item list including recommendation candidates in descending order of the second estimated evaluation values $f(v1, \ldots, vN)$. Note that, for the number of recommendation items included in the recommendation item list, a pre-specified number of recommendation items may be set as an upper limit.

As described above, the information processing apparatus if according to the fifth variant includes the evaluator 221 of the first variant and the evaluator 225 of the third variant. Then, the determiner 222f determines recommendation items to be recommended to a target user from a plurality of recommendation candidates, using an estimated evaluation value of each recommendation candidate for the target user which is estimated by the evaluator 221 and the degrees of matching of user's preference with respect to the recommendation candidates which are evaluated by the evaluator 225.

By this, recommendation items with high second estimated evaluation values which are determined by combining the estimated evaluation values estimated by the evaluator 221 with the degrees of matching evaluated by the evaluator 225 can be recommended to the target user. By that, for example, recommendation items that have a high evaluation from a similar user group and that also match the preferences of the target user him/herself can be recommended to the target user.

Note that although, in the fifth variant, new second estimated evaluation values are determined using a function whose arguments are an estimated evaluation value and the degree of matching, the configuration is not limited thereto. The determiner 222f may determine recommendation items to be recommended to the target user from a plurality of recommendation candidates, according to preset lexicographic order, using estimated evaluation values and the degrees of matching. Specifically, the determiner 222f may determine recommendation items to be recommended to the target user from a plurality of recommendation candidates, by referring to a preset correspondence between a relationship between an estimated evaluation value and the degree of matching and a result of comparison in second evaluation value between recommendation candidates, for an estimated evaluation value of each recommendation candidate for the target user and the degrees of matching of user's preference with respect to the recommendation candidates.

For example, it is assumed that there is preset a correspondence where, when the estimated evaluation value of a recommendation candidate A is a1 and the degree of matching is a2 and the estimated evaluation value of a recommendation candidate B is b1 and the degree of matching is b2, the second estimated evaluation value of the recommendation candidate A is higher than the second estimated evaluation value of the recommendation candidate B when $a1>b1$ or when $a1=b1$ and $a2>b2$. At this time, when the actual data is, for example, $a1>b1$, the recommendation candidate A has a higher second estimated evaluation value than the recommendation candidate B. Thus, the determiner 222f creates, for example, a recommendation item list in which the recommendation candidate A is arranged in a higher position than the recommendation candidate B.

As such, the determiner 222f may create a recommendation item list including recommendation candidates in descending order of second estimated evaluation value, by checking the estimated evaluation values a1 and b1 and the degrees of matching a2 and b2 against the preset correspondence. Note that, for the number of recommendation items included in the recommendation item list, a pre-specified number of recommendation items may be set as an upper limit.

Second Embodiment

Next, a second embodiment will be described. Conventionally, in online shopping, purchase histories and browsing histories for a large number of people are analyzed and recommendation of commodities based on the analysis is widely performed. However, recommendation targeting brick-and-mortar stores has not been performed so far. In the present embodiment, on the other hand, an information processing apparatus 1 capable of performing recommendation targeting brick-and-mortar stores will be described.

Here, when brick-and-mortar stores are recommended to a user going around while using a portable terminal, recommending stores or commodities that compete with a store where the user is currently staying is the act of losing business opportunities for the store and thus is generally avoided. This becomes a barrier to introducing cross-store recommendation services.

To avoid such recommendation, conventionally, competing stores are individually defined and individually controlled or stores are categorized or assigned attributes by commodities dealt thereby, to avoid recommendation of other stores of the same type of business when the user is present in a certain store.

However, such a process requires a large amount of work due to detailed adjustments. In addition, for example, there are a case in which stores of different types of business such as a deli store and a restaurant have a competitive relationship with each other and a case in which dell stores have a complementary relationship with each other. Thus, what stores compete against each other is not obvious. Here, the competitive relationship between stores is a relationship where customers visit the stores for substantially the same purpose and are provided with satisfaction of substantially the same type, and thus, when the number of customer visits increases in one store, the number of customer visits decreases in the other store. The complementary relationship between stores is a relationship where, when the number of customer visits increases in one store, the number of customer visits increases in the other store, such as a relationship between a store that sells tea and a store that sells teacakes.

Hence, above-described conventional methods may lead to that stores that actually do not compete against with each other cannot be recommended or may reversely lead to that stores that actually compete against each other are erroneously recommended. The former case has a problem that due to limited recommendation items, appeal of recommendation for a user decreases, and the latter case has a problem that by recommending competing stores the customer store satisfaction level decreases.

In view of the above-described problems, an object of an information processing apparatus $1g$ according to the present embodiment is to recommend stores on a priority basis that have a complementary relationship with a store where a target user stays, while reducing the frequency of recommendation of stores having a competitive relationship with the store.

The information processing apparatus $1g$ according to the present embodiment determines, using preference information and a plurality of recommendation candidates ranging over a plurality of genres which are stored in an accessible storage apparatus, the degrees of matching of user's preference with respect to the recommendation candidates. Then, the information processing apparatus $1g$ corrects, for each recommendation candidate, the degree of matching for the recommendation candidate, according to relationship information indicating whether a target item and the recommendation candidate have a competitive relationship or a complementary relationship with each other, and determines recommendation items from the recommendation candidates, according to the corrected degrees of matching obtained by the correction.

The configuration of an information processing system according to the present embodiment is the same as that of the information processing system 100 according to the first embodiment shown in FIG. 1 and thus a description thereof is omitted.

Next, a summary of processes performed by the information processing system according to the present embodiment will be described. When a terminal apparatus 2 displays a recommendation display screen based on a target user's operation, the terminal apparatus 2 performs positioning by GPS to obtain location information indicating the location of the terminal apparatus 2. The terminal apparatus 2 transmits a recommendation request including the location information and user identification information to the information processing apparatus $1g$ through a base station 3 and a network 4.

When the information processing apparatus $1g$ receives the recommendation request from the terminal apparatus 2, the information processing apparatus $1g$ performs processes such as those described later and thereby generates recommended content for the target user and sends back the generated recommended content to the terminal apparatus 2. The terminal apparatus 2 presents the recommended content received from the information processing apparatus $1g$, to the target user.

Next, a configuration of the information processing apparatus $1g$ according to the present embodiment will be described. A hardware configuration of the information processing apparatus $1g$ according to the present embodiment is the same as that of the information processing apparatus 1 according to the first embodiment shown in FIG. 2 and thus a description thereof is omitted.

Figure 12:
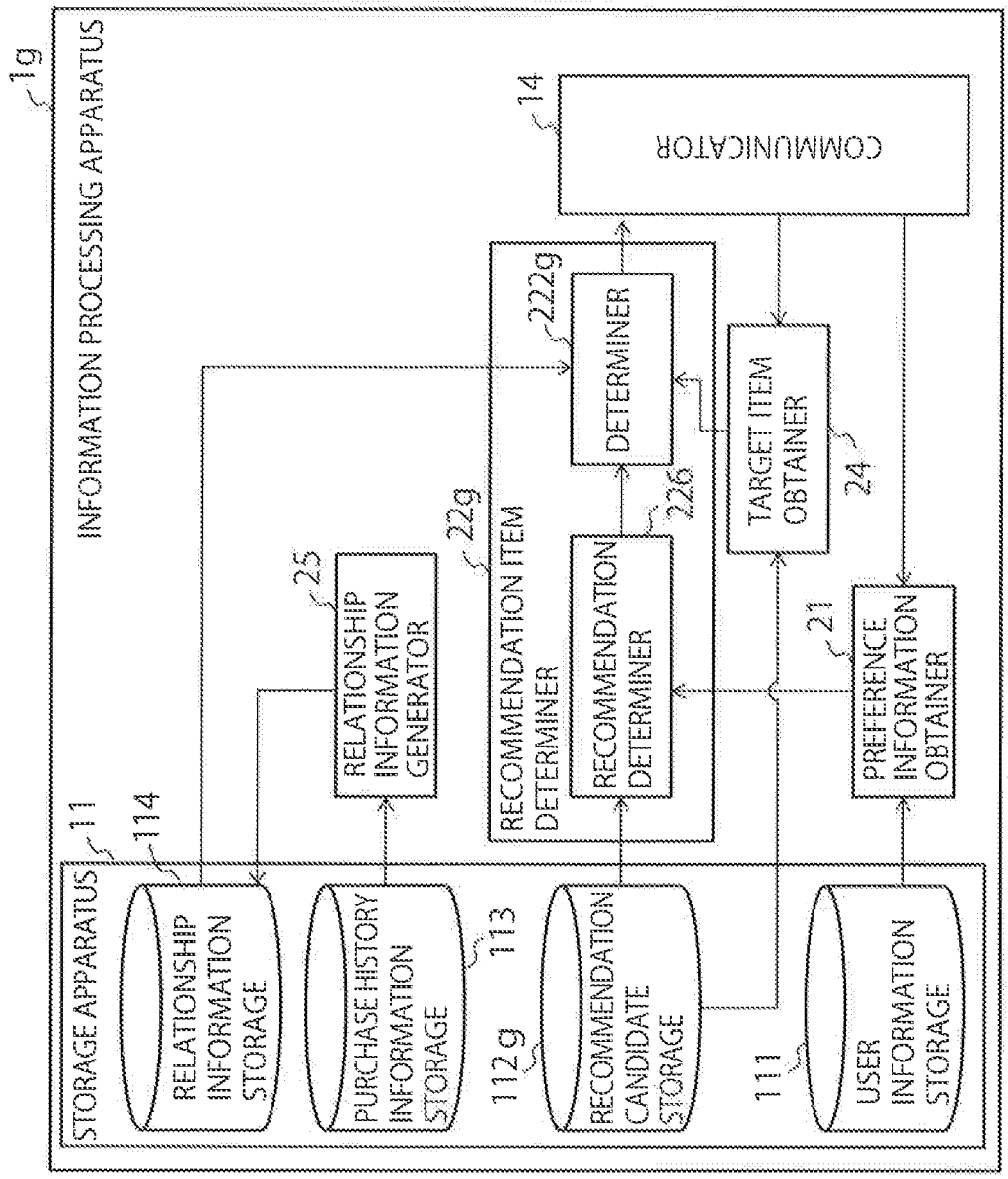
FIG. 12 is a diagram showing a logical configuration of an information processing apparatus 1g of a second embodiment.

Next, a logical configuration of the information processing apparatus $1g$ of the second embodiment will be described using FIG. 12. FIG. 12 is a diagram showing a logical configuration of the Information processing apparatus $1g$ of the second embodiment. Note that common components to those in FIG. 3 are denoted by the same reference signs and a specific description thereof is omitted. The configuration of the information processing apparatus $1g$ of the second embodiment differs from the configuration of the information processing apparatus 1 of the first embodiment of FIG. 3 in that a recommendation item determiner 22 is changed to a recommendation item determiner $22g$, a target item obtainer 24 and a relationship information generator 25 are added, a recommendation candidate storage 112 of a storage apparatus 11 is changed to a recommendation candidate storage $112g$, and a storage apparatus 11 further includes a purchase history information storage 113 and a relationship information storage 114.

The purchase history information storage 113 stores pieces of purchase history information indicating the purchase histories for a plurality of users.

The relationship information generator 25 generates, for each set of recommendation candidates, relationship information Indicating whether the recommendation candidates have a competitive relationship or a complementary relationship with each other, using the purchase history information. Specifically, for example, the relationship information generator 25 reads the purchase history information from the purchase history information storage 113 and generates, for each set of recommendation candidates, relationship information indicating whether the recommendation candidates have a competitive relationship or a complementary relationship with each other, using the read purchase history information.

Then, the relationship information generator 25 allows the relationship information storage 114 to store the obtained relationship information in association with the set of recommendation candidates. By this, in the relationship information storage 114, sets of recommendation candidates and pieces of relationship information each indicating whether the recommendation candidates have a competitive relationship or a complementary relationship with each other are stored so as to be associated with each other.

An example of the process of generating relationship information by the relationship information generator 25 will be described below.

(1) First, the relationship information generator 25 classifies, for each user, purchase data on a per specified time period (e.g., one hour or one day) and sets of purchase data which is put together, as T1, T2, T3, . . . , Tn.

The sets of purchase data T1, T2, T3, . . . , Tn will be described below using FIG. 13.

Figure 13:
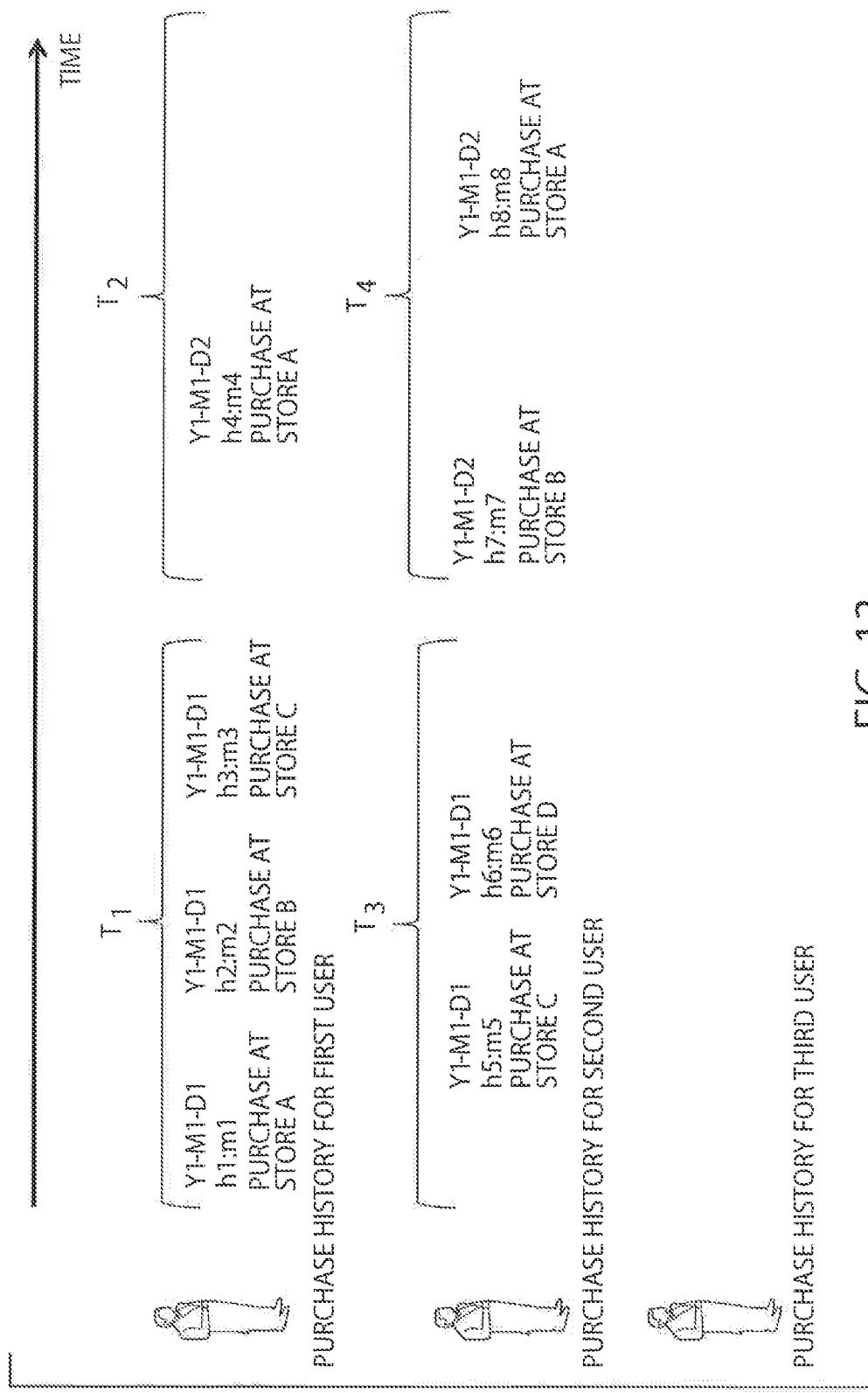
FIG. 13 is a schematic diagram showing an example of a purchase history for each user.

FIG. 13 is a schematic diagram showing an example of a purchase history for each user. As shown in FIG. 13, a first user has made a purchase, for example, at stores A, B, and C on a first day and thus T1 is set such that T1={A, B, C}. In addition, the first user has made a purchase at the store A on a second day and thus T2 is set such that T2={A}. In addition, a second user has made a purchase at stores C and D on a first day and thus T3 is set such that T3={C, D}. In addition, the second user has made a purchase at the stores B and A on a second day and thus T4 is set such that T4={B, A}.

(2) Then, the relationship information generator 25 calculates the proportion $\alpha$ of purchase data including a first recommendation candidate Item1 in the sets of purchase data T1 to Tn ($\alpha = |\{Ti|Item1 \in Ti\}|/n$) and the proportion $\beta$ of purchase data including the first recommendation candidate Item1 in purchase data including a second recommendation candidate Item2 among the sets of purchase data T1 to Tn ($\beta = |\{Ti|Item1 \in Ti, Item2 \in Ti\}|/|\{Ti|Item2 \in Ti\}|$). Then, the relationship information generator 25 calculates a ratio $\beta/\alpha$ between the proportions $\alpha$ and $\beta$, as relationship information. The relationship information generator allows the relationship information storage 114 to store the ratio $\beta/\alpha$ in association with a set of the recommendation candidate Item1 and the recommendation candidate Item2.

Here, if $\beta >> \alpha$, then, when a purchase is made at the second recommendation candidate Item2, the number of purchases at the first recommendation candidate Item1 also increases, and thus, they have a complementary relationship with each other.

On the other hand, if $\beta << \alpha$, then, when a purchase is made at the second recommendation candidate Item2, the number of purchases at the first recommendation candidate Item1 decreases, and thus, they have a competitive relationship with each other.

In addition, if $\beta \approx \alpha$, then, the first recommendation candidate Item1 and the second recommendation candidate Item2 have a small relationship.

Hence, the first recommendation candidate Item1 and the second recommendation candidate Item2 have a stronger complementary relationship with each other as the ratio $\beta/\alpha$ gets larger than 1, and have a stronger competitive relationship with each other as the ratio $\beta/\alpha$ gets smaller than 1.

As such, the relationship information is information based on the proportion $\alpha$ of purchase data including the first recommendation candidate in a plurality of purchase data units classified on a per specified time, and the proportion $\beta$ of purchase data including the first recommendation candidate in purchase data including the second recommendation candidate among the plurality of purchase data units. In the present embodiment, as an example, the relationship information is the ratio $\beta/\alpha$ between the proportions $\alpha$ and $\beta$.

The recommendation candidate storage 112g stores, in addition to recommendation candidate information about recommendation candidates, pieces of location information indicating the locations of stores and pieces of store attribute information indicating the attributes (e.g., names) of the stores in association with each other.

The target item obtainer 24 obtains a target item serving as a user's interest target, visit target, consumption target, receiving target, participation target, or browsing target.

Here, in the present embodiment, as an example, the target item is a store where the target user stays. For example, the target item obtainer 24 checks location information included in a recommendation request which is received by a communicator 14 from the terminal apparatus 2 against location information stored in the recommendation candidate storage 112g. Then, the target item obtainer 24 obtains a store closest to a location indicated by the location information included in the recommendation request, as a store where the target user stays.

Note that the target item obtainer 24 may estimate a store where the target user stays, using, for example, an advanced estimation method described in the literature "Learning to Rank for Spatiotemporal Search" (Blake Shaw, Jon Shea, Siddhartha Sinha, Andrew Hogue; WSDM 2013).

The recommendation item determiner 22g determines recommendation items to be recommended to the target user. For example, the recommendation item determiner 22g determines the recommendation items from a plurality of recommendation candidates, using pieces of relationship information each indicating whether the target item and a recommendation candidate have a competitive relationship or a complementary relationship with each other, in addition to the above-described preference information and the above-described recommendation candidate information. Here, the recommendation items according to the present embodiment are, as an example, stores different than a store where the target user stays. Here, the recommendation item determiner 22g includes a recommendation determiner 226 and a determiner 222g.

The recommendation determiner 226 determines, for each recommendation candidate, the degree of matching of user's preference with respect to the recommendation candidate, using the preference information of the target user and a plurality of recommendation candidates ranging over a plurality of genres which are stored in the accessible storage apparatus 11. Specifically, for example, the recommendation determiner 226 determines, for each recommendation candidate, the degree of matching of user's preference with respect to the recommendation candidate, using the preference information of the user and the recommendation candidates stored in the recommendation candidate storage 112g. Then, for example, the recommendation determiner 226 extracts all or only some of the recommendation candidates in descending order of the degree of matching. Here, the details of the process of determining the degree of matching are the same as those of the third variant of the first embodiment, and thus, a description thereof is omitted.

The determiner 222g corrects, for each recommendation candidate, the degree of matching for the recommendation candidate, according to relationship information indicating whether the target item and the recommendation candidate have a competitive relationship or a complementary relationship with each other, and determines recommendation items from the recommendation candidates, according to the corrected degrees of matching obtained by the correction. In the present embodiment, as an example, the correction is made for each recommendation candidate extracted by the recommendation determiner 226.

In addition, upon correction, the determiner 222g makes a correction to reduce the degree of matching for the recommendation candidate, when the target item and the recommendation candidate have a competitive relationship with each other, and makes a correction to increase the degree of matching for the recommendation candidate, when the target item and the recommendation candidate have a complementary relationship with each other. Specifically, the determiner 222g calculates a corrected degree of matching S' by multiplying the degree of matching S for each recommendation candidate by a correction coefficient $(\beta/\alpha)C$ (C is a constant). Then, for example, the determiner 222g creates a recommendation item list in which the recommendation candidates are arranged in descending order of the corrected degree of matching S'.

Next, correction of the degree of matching S by the determiner 222g will be described using FIG. 14. FIG. 14 is a diagram showing an example of computation of the corrected degree of matching according to the second embodiment. This FIG. 14 is a table showing a set of the degree of matching S, a correction coefficient $(\beta/\alpha)C$, and the corrected degree of matching S' for each store serving as a recommendation candidate for when a store where the target user is currently staying is a "Japanese deli store E".

For example, for a restaurant G, a degree of matching of 5.0 is multiplied by a correction coefficient of 0.3, by which the value of the corrected degree of matching S' is 1.5. On the other hand, for a miso soup store M, a degree of matching of 2.0 is multiplied by a correction coefficient of 2.5, by which the value of the corrected degree of matching S' is 5. By this, the determiner 222g can arrange the miso soup store M having a complementary relationship in a higher position on a recommendation item list than the restaurant G having a competitive relationship, and thus, can recommend a store having a complementary relationship on a priority basis while reducing the frequency of recommendation of a store having a competitive relationship.

Note that the determiner 222g may not include in the recommendation item list those recommendation candidates with a correction coefficient $(\beta/\alpha)C$ smaller than 1 as they are considered having a competitive relationship.

Figure 15:
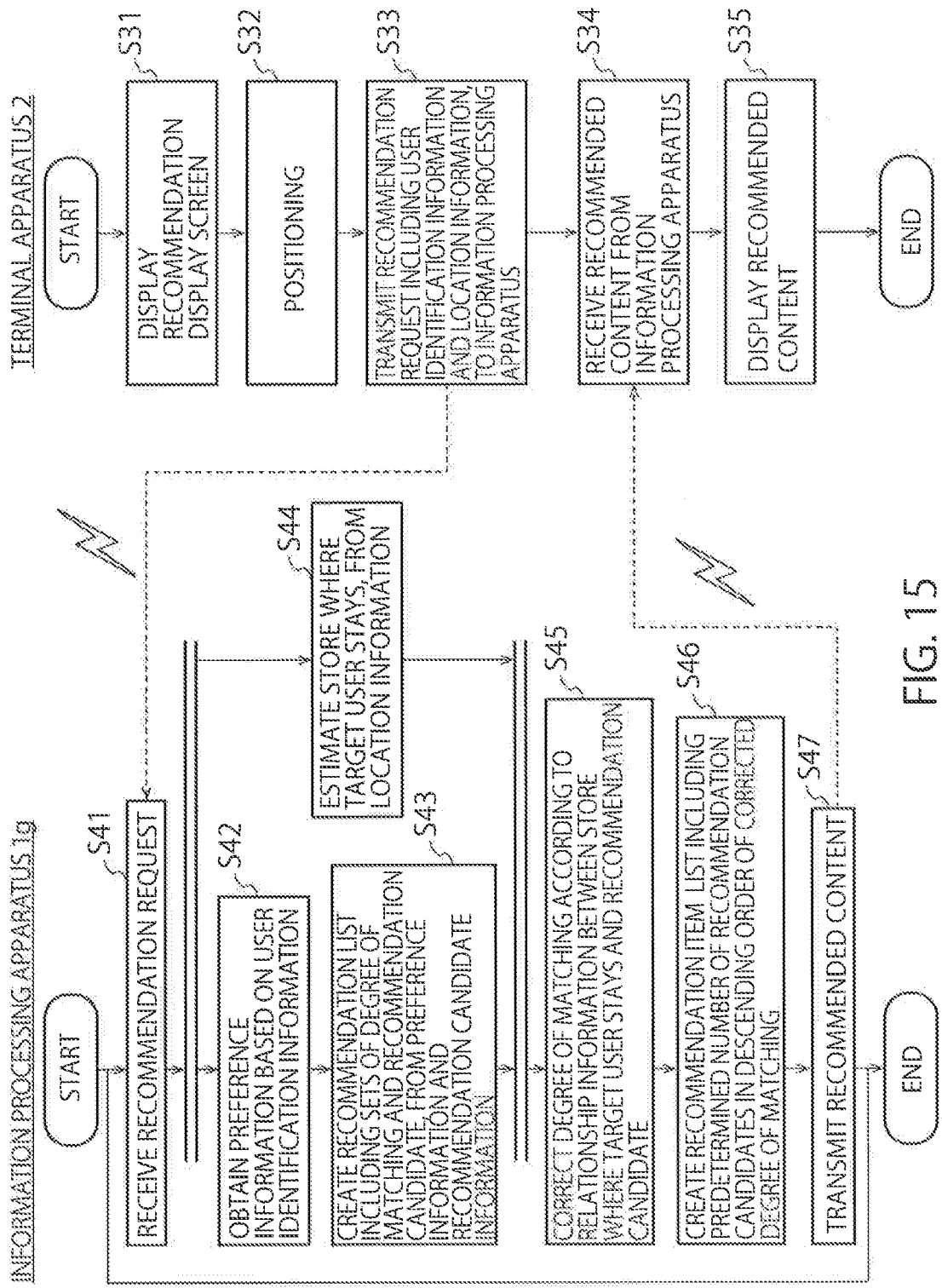
FIG. 15 is a flowchart showing an example of processes of the second embodiment.

Next, FIG. 15 is a flowchart showing an example of processes of the second embodiment.

(Step S31) First, the terminal apparatus 2 displays a recommendation display screen, according to a user's operation.

(Step S32) Then, the terminal apparatus 2 measures the location of the terminal apparatus 2 using, for example, GPS (Global Positioning System). By this, the terminal apparatus 2 can obtain location information indicating the location of the terminal apparatus 2.

(Step S33) Then, the terminal apparatus 2 transmits a recommendation request including user identification information and the location information to the information processing apparatus 1g.

(Step S41) Then, the communicator 14 of the information processing apparatus 1g receives the recommendation request transmitted from the terminal apparatus 2.

Subsequently, the information processing apparatus 1g performs a series of processes at steps S42 and S43 in parallel with a process at step S44. Note that the series of processes at steps S42 and S43 and the process at step S44 are not in a particular order.

(Step S42) A preference information obtainer 21 of the information processing apparatus 1g obtains preference information, based on the user identification information included in the recommendation request received at step S41.

(Step S43) Then, the recommendation determiner 226 of the information processing apparatus 1g creates a recommendation list including sets of the degree of matching and a recommendation candidate, using the preference information and recommendation candidate information.

(Step S44) In parallel with steps S42 and S43, the target item obtainer 24 of the information processing apparatus 1g estimates a store where the target user stays, using the location information included in the recommendation request received at step S41.

(Step S45) Then, the determiner 222g of the information processing apparatus 1g corrects the degrees of matching, according to relationship information between the store where the target user stays and the recommendation candidates.

(Step S46) Then, the determiner 222g of the information processing apparatus 1g creates, for example, a recommendation item list including a predetermined number of recommendation candidates in descending order of the corrected degree of matching.

(Step S47) Then, the communicator 14 of the information processing apparatus 1g transmits recommended content including the recommendation item list to the terminal apparatus 2.

(Step S34) Then, the terminal apparatus 2 receives the recommended content from the information processing apparatus 1g.

(Step S35) Then, the terminal apparatus 2 displays the recommended content received at step S34.

As described above, in the second embodiment, the target item obtainer 24 obtains, as a target item, a store where a target user stays. Then, the recommendation determiner 226 determines, for each recommendation candidate, the degree of matching of user's preference with respect to the recommendation candidate, using preference information of the target user and a plurality of recommendation candidates ranging over a plurality of genres which are stored in the accessible storage apparatus 11. The determiner 222g corrects, for each recommendation candidate, the degree of matching for the recommendation candidate, according to relationship information indicating whether the target item and the recommendation candidate have a competitive relationship or a complementary relationship with each other, and determines recommendation items from the recommendation candidates, according to the corrected degrees of matching obtained by the correction.

By this, the probability of including, in recommendation items, stores having a competitive relationship with a store where the target user stays can be reduced, enabling to reduce the frequency of recommendation of competing stores.

Hence, the customer store satisfaction level can be improved. On the other hand, stores having a complementary relationship with the store where the target user stays can be included in recommendation items on a priority basis. Thus, complementary stores can be recommended on a priority basis. Hence, user's willingness to purchase can be improved. In addition, work for individually setting up elimination of competing stores which is done in conventional techniques is not required, enabling to reduce the cost for operation.

In addition, in the present embodiment, the determiner 222g creates, as an example, a recommendation item list in which recommendation candidates are arranged in descending order of the corrected degree of matching S'. By this, recommendation items are not narrowed down more than necessary, enabling to avoid a reduction in appeal for the user.

Note that although in the present embodiment, as an example, items to be recommended are stores, the items are not limited thereto, and goods (e.g., commodities), services, events, or content may be recommended. For example, when the items to be recommended are commodities, complementary goods for a commodity purchased by the target user can be recommended on a priority basis while reducing the frequency of recommendation of substitute goods for the commodity purchased by the target user. Here, the "substitute goods (rival goods)" refer to commodities or services having a competitive relationship with a target commodity or service. Specifically, the substitute goods are goods that compete against with each other because they are used for substantially the same purpose and provide satisfaction of substantially the same type, such as bread and rice, coffee and tea, and butter and margarine. The complementary goods refer to commodities or services used in combination with the target commodity or service. Specifically, the complementary goods are commodities or services having a complementary relationship where as the consumption or use of one increases, the consumption or use of the other also increases, such as bread and butter.

By this, the frequency of recommendation of substitute goods can be reduced. Thus, the satisfaction of a customer store where the target user has purchased orused a target commodity or service can be increased. In addition, since complementary goods can be recommended to the target user on a priority basis, target user's willingness to purchase can be improved.

Note that in the relationship information storage 114 of the storage apparatus 11, items having a complementary relationship with each other may be stored so as to be associated with each other. In that case, the recommendation item determiner 22g may determine items having a complementary relationship with a target item among a plurality of recommendation candidates to be recommendation items, by referring to the storage apparatus 11 where items having a complementary relationship with each other are stored so as to be associated with each other.

Specifically, for example, the recommendation determiner 226 may compare preference information with a plurality of recommendation candidates ranging over a plurality of genres which are stored in the accessible storage apparatus 11, and determine recommendation items from the plurality of recommendation candidates, according to the comparison results. Then, the determiner 222g may determine items having a complementary relationship with a target item among the recommendation candidates to be recommendation items, by referring to the storage apparatus 11 where items having a complementary relationship with each other are stored so as to be associated with each other.

Note that, as in the first embodiment, a visit sensor that detects a user's visit to a store may be provided in stores, and store identification information that identifies a store where a visit sensor is installed may be wirelessly transmitted to a terminal apparatus 2 used by a target user. Then, the terminal apparatus 2 may transmit a recommendation request including the store identification information to the information processing apparatus 1g.

In that case, in the recommendation candidate storage 112g of the information processing apparatus 1g, pieces of store identification information and pieces of store attribute information indicating the attributes (e.g., names and addresses) of stores are pre-stored so as to be associated with each other. Then, when the communicator 14 of the information processing apparatus 1g obtains the recommendation request including the store identification information, the recommendation item determiner 22g may read store attribute information associated with the store identification information from the recommendation candidate storage 112g. By this, the information processing apparatus 1g can identify a store where the target user has visited. Hence, even in the inside of a building where positioning by GPS is difficult, a store where the target user stays can be estimated with high accuracy.

Note that, although the recommendation determiner 226 determines, for each recommendation candidate, the degree of matching of user's preference with respect to the recommendation candidate, the configuration is not limited thereto, and the recommendation determiner 226 may determine an estimated evaluation value of each recommendation candidate for the target user by the same procedure as that of the first variant of the first embodiment. In that case, the determiner 222g may correct, for each recommendation candidate, an estimated evaluation value of the recommendation candidate, according to relationship information indicating whether a target item and the recommendation candidate have a competitive relationship or a complementary relationship with each other, and determine recommendation items from the recommendation candidates, according to the corrected estimated evaluation values obtained by the correction.

Note that the configurations of an information processing apparatus of each embodiment may be distributed over a plurality of apparatuses, and in a system including the plurality of apparatuses, the plurality of apparatuses may process the processes of the information processing apparatus of each embodiment in a distributed manner. In addition, in each embodiment, a terminal apparatus may have a configuration of a part of an information processing apparatus, instead of the information processing apparatus.

In addition, a program for performing the processes of an Information processing apparatus of each embodiment may be recorded in a computer-readable recording medium, and the program recorded in the recording medium may be read into a computer system to allow a processor to execute the program, by which the above-described various processes for the information processing apparatus of each embodiment may be performed.

Note that the term "computer system" as used herein may be one including an OS and hardware such as peripheral devices. In addition, the "computer system" also includes a website provision environment (or display environment) in the case of using a WWW system. In addition, the "computer-readable recording medium" refers to a writable, non-volatile memory such as a flexible disk, a magneto-optical disk, a ROM, or a flash memory, a portable medium such as a CD-ROM, or a storage apparatus such as a hard disk included in a computer system.

Furthermore, the "computer-readable recording medium" also includes one that holds a program for a certain period of time, such as a volatile memory (e.g., a DRAM (Dynamic Random Access Memory)) included in a computer system which serves as a server or a client when the program is transmitted through a network such as the Internet or a communication line such as a telephone line. In addition, the above-described program may be transmitted from a computer system that stores the program in a storage apparatus or the like to another computer system through a transmission medium or by a transmitted wave in a transmission medium. Here, the "transmission medium" through which the program is transmitted refers to a medium having the function of transmitting information, such as a network (communication network), e.g., the Internet, or a communication line, e.g., a telephone line. In addition, the above-described program may be one for implementing some of the aforementioned functions. Furthermore, the above-described program may be one that can implement the aforementioned functions in combination with a program already recorded in a computer system, which is a so-called "differential file (differential program)".

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing apparatus comprising processing circuitry configured to:
   acquire preference information indicating preferences of a target user to which recommendation is to be made, the preferences ranging over a plurality of genres;
   acquire recommendation candidate information about a plurality of recommendation candidates ranging over a plurality of genres, the recommendation candidate information including assigned attributes and being stored in an accessible storage apparatus;
   determine, for each of the recommendation candidates, a degree of matching of at least one preference of the target user with an attribute assigned to recommendation candidate information;
   generate relationship information that expresses whether a relationship between the target item and the recommendation candidate is a competitive relationship or a complementary relationship, based on the at least one user's purchase history;
   correct, for each of the recommendation candidates, a degree of matching for the recommendation candidate, according to relationship information;
   determine, based on the corrected degree of matching, a recommendation item to be recommended to the target user from the plurality of recommendation candidates; and
   acquire a target item serving as at least one user's interest target, visit target, consumption target, receiving target, participation target, or browsing target,
   wherein the recommendation item is selected from the plurality of recommendation candidates based on the relationship information in addition to the preference information and the recommendation candidate information.

2. The apparatus according to claim 1, wherein the processing circuitry acquires location information indicating a location of a terminal apparatus, and determines the recommendation item, further using the location information in addition to the preference information, the recommendation candidate information and the relationship information.

3. The apparatus according to claim 1, wherein, when the target item and the recommendation candidate have a competitive relationship with each other, the processing circuitry makes a correction to reduce the degree of matching for the recommendation candidate, and when the target item and the recommendation candidate have a complementary relationship with each other, the processing circuitry makes a correction to increase the degree of matching for the recommendation candidate.

4. The apparatus according to claim 1, wherein the relationship information is information based on a proportion of purchase data including a first recommendation candidate in a plurality of purchase data units classified on a per specified time, and a proportion of purchase data including the first recommendation candidate in purchase data including a second recommendation candidate.

5. The apparatus according to claim 1, wherein the processing circuitry:
   determines an estimated evaluation value of each of the recommendation candidates for the target user; and
   corrects, for each of the recommendation candidates, an estimated evaluation value of the recommendation candidate, according to relationship information and determines the recommendation item from the recommendation candidates, according to the corrected estimated evaluation values obtained by the correction, the relationship information indicating whether the target item and the recommendation candidate have a competitive relationship or a complementary relationship with each other.

6. The apparatus according to claim 1, the processing circuitry being configured to:
   obtain a target item serving as a target, and
   determine an item having a complementary relationship with the target item among the plurality of recommendation candidates to be a recommendation item, by referring to a storage apparatus in which items having a complementary relationship with each other are stored so as to be associated with each other.

7. An information processing system comprising:
   an information processing apparatus connected to a network;
   a base station that communicates with the information processing apparatus through the network; and
   a terminal apparatus that performs wireless communication with the base station,
   the information processing apparatus comprising processing circuitry configured to:
      acquire preference information indicating preferences of a target user to which recommendation is to be made, the preferences ranging over a plurality of genres;
      acquire recommendation candidate information about a plurality of recommendation candidates ranging over a plurality of genres, the recommendation candidate information including assigned attributes and being stored in an accessible storage apparatus;
      determine, for each of the recommendation candidates, a degree of matching of at least one preference of the target user with an attribute assigned to recommendation candidate information;
      generate relationship information that expresses whether a relationship between the target item and the recommendation candidate is a competitive relationship or a complementary relationship, based on the at least one user's purchase history;
      correct, for each of the recommendation candidates, a degree of matching for the recommendation candidate, according to relationship information;
      determine, based on the corrected degree of matching, a recommendation item to be recommended to the target user from the plurality of recommendation candidates; and
      acquire a target item serving as at least one user's interest target, visit target, consumption target, receiving target, participation target, or browsing target,
      wherein the recommendation item is selected from the plurality of recommendation candidates based on the relationship information in addition to the preference information and the recommendation candidate information.

8. An information processing method comprising:

acquiring, by a preference information obtainer, preference information indicating preferences of a target user to which recommendation is to be made, the preferences ranging over a plurality of genres;

acquiring recommendation candidate information about a plurality of recommendation candidates ranging over a plurality of genres, the recommendation candidate information including assigned attributes and being stored in an accessible storage apparatus;

determining, by a recommendation item determiner, for each of the recommendation candidates, a degree of matching of at least one preference of the target user with an attribute assigned to recommendation candidate information;

generating relationship information that expresses whether a relationship between the target item and the recommendation candidate is a competitive relationship or a complementary relationship, based on the at least one user's purchase history;

correcting, for each of the recommendation candidates, a degree of matching for the recommendation candidate, according to relationship information;

determining, by the recommendation item determiner and based on the corrected degree of matching, a recommendation item to be recommended to the target user from the plurality of recommendation candidates; and acquiring a target item serving as at least one user's interest target, visit target, consumption target, receiving target, participation target, or browsing target, wherein the recommendation item is selected from the plurality of recommendation candidates based on the relationship information in addition to the preference information and the recommendation candidate information.

9. A non-transitory computer-readable recording medium that stores a program executed by at least one processor, the program causing the at least one processor to perform operations comprising:

acquiring preference information indicating preferences of a target user to which recommendation is to be made, the preferences ranging over a plurality of genres;

acquiring recommendation candidate information about a plurality of recommendation candidates ranging over a plurality of genres, the recommendation candidate information including assigned attributes and being stored in an accessible storage apparatus;

determining, for each of the recommendation candidates, a degree of matching of at least one preference of the target user with an attribute assigned to recommendation candidate information;

generating relationship information that expresses whether a relationship between the target item and the recommendation candidate is a competitive relationship or a complementary relationship, based on the at least one user's purchase history;

correcting, for each of the recommendation candidates, a degree of matching for the recommendation candidate, according to relationship information;

determining, based on the corrected degree of matching, a recommendation item to be recommended to the target user from the plurality of recommendation candidates; and acquiring a target item serving as at least one user's interest target, visit target, consumption target, receiving target, participation target, or browsing target wherein the recommendation item is selected from the plurality of recommendation candidates based on the relationship information in addition to the preference information and the recommendation candidate information.

\* \* \* \* \*